US010215568B2

(12) United States Patent
Klosinski, Jr. et al.

(10) Patent No.: US 10,215,568 B2
(45) Date of Patent: Feb. 26, 2019

(54) SYSTEMS AND METHODS FOR TRACKING MOTION, PERFORMANCE, AND OTHER DATA FOR AN INDIVIDUAL SUCH AS A WINTER SPORTS ATHLETE

(71) Applicant: Vision Service Plan, Rancho Cordova, CA (US)

(72) Inventors: Richard Chester Klosinski, Jr., Sacramento, CA (US); Meghan Kathleen Murphy, Davis, CA (US); Matthew Allen Workman, Sacramento, CA (US); Jay William Sales, Citrus Heights, CA (US)

(73) Assignee: Vision Service Plan, Rancho Cordova, CA (US)

(*) Notice: Subject to any disclaimer, the term of this patent is extended or adjusted under 35 U.S.C. 154(b) by 148 days.

(21) Appl. No.: 15/074,679

(22) Filed: Mar. 18, 2016

(65) Prior Publication Data

US 2016/0223578 A1    Aug. 4, 2016

Related U.S. Application Data

(63) Continuation-in-part of application No. 14/610,501, filed on Jan. 30, 2015.
(Continued)

(51) Int. Cl.
*G06F 19/00* (2018.01)
*G01C 21/16* (2006.01)
(Continued)

(52) U.S. Cl.
CPC .......... *G01C 21/165* (2013.01); *G01C 21/08* (2013.01); *G01S 19/19* (2013.01); *G01S 19/49* (2013.01);
(Continued)

(58) Field of Classification Search
CPC ...... A42B 3/045; A61B 256/0219; A61B 5/11
(Continued)

(56) References Cited

U.S. PATENT DOCUMENTS 3,505,879 A    4/1970   Vanderberg
3,548,663 A    12/1970  Radin
(Continued)

FOREIGN PATENT DOCUMENTS

EP    2778612    12/2017
GB    2396421    6/2004
(Continued)

OTHER PUBLICATIONS

Michael Franco, Tzoa wearable turns you into a walking air-quality sensor, Dec. 9, 2014, CNET, https://www.cnet.com/news/tzoa-wearable-turns-you-into-a-walking-air-quality-sensor/.
(Continued)

*Primary Examiner* — Edward Raymond
(74) *Attorney, Agent, or Firm* — Brient IP Law, LLC

(57) ABSTRACT

A winter sports tracking system, in various embodiments, is configured to measure winter sports athlete speed, heading, distance traveled, acceleration, and other motion related measurements based at least in part on magnetic field measurements taken by one or more magnetometers. In a particular embodiment, the system comprises one or more magnetometers (e.g., that may be embedded in one or more wearable devices, such as eyewear) and at least one magnet disposed on a portion of the winter sports athlete or their equipment. The system is configured to receive magnetic field information associated with the at least one magnet using the one or more magnetometers and determine the speed and other data based at least in part on the magnetic
(Continued)

field information. In various embodiments, the system is configured to track movement and speed of a skier or snowboarder.

19 Claims, 4 Drawing Sheets

Related U.S. Application Data

(60) Provisional application No. 62/135,660, filed on Mar. 19, 2015.

(51) Int. Cl.
| | |
|---|---|
| G01C 21/08 | (2006.01) |
| G01S 19/19 | (2010.01) |
| G01S 19/49 | (2010.01) |
| G06F 1/16 | (2006.01) |
| G06K 9/00 | (2006.01) |
| H04M 1/725 | (2006.01) |

(52) U.S. Cl.
CPC ......... *G06F 1/163* (2013.01); *G06K 9/00342* (2013.01); *H04M 1/725* (2013.01)

(58) Field of Classification Search
USPC .............................. 702/145, 150, 182–185
See application file for complete search history.

(56) References Cited

U.S. PATENT DOCUMENTS

| | | | |
|---|---|---|---|
| 3,972,038 | A | 7/1976 | Nasa |
| 4,100,401 | A | 7/1978 | Tutt et al. |
| 4,186,609 | A | 2/1980 | Baermann |
| 4,195,642 | A | 4/1980 | Price et al. |
| 4,281,663 | A | 8/1981 | Pringle |
| 4,407,295 | A | 10/1983 | Steuer et al. |
| 4,434,801 | A | 3/1984 | Jiminez et al. |
| 4,855,942 | A | 8/1989 | Bianco |
| 4,878,749 | A | 11/1989 | McGee |
| 4,919,530 | A | 4/1990 | Hyman |
| 5,422,816 | A | 6/1995 | Sprague et al. |
| 5,452,480 | A | 9/1995 | Ryden |
| 5,497,143 | A | 3/1996 | Matsuo et al. |
| 5,585,871 | A | 12/1996 | Linden |
| 5,670,872 | A | 9/1997 | Van de Walle et al. |
| 5,746,501 | A | 5/1998 | Chien et al. |
| 5,891,042 | A | 4/1999 | Sham et al. |
| 5,931,764 | A | 8/1999 | Freeman et al. |
| 5,966,680 | A | 10/1999 | Butnaru |
| 5,976,083 | A | 11/1999 | Richardson et al. |
| 6,013,007 | A | 1/2000 | Root et al. |
| 6,183,425 | B1 | 2/2001 | Whalen et al. |
| 6,218,958 | B1 | 4/2001 | Eichstaedt et al. |
| 6,241,684 | B1 | 6/2001 | Amano et al. |
| 6,325,507 | B1 | 12/2001 | Jannard et al. |
| 6,381,482 | B1 | 4/2002 | Jayaraman et al. |
| 6,431,705 | B1 | 8/2002 | Linden et al. |
| 6,439,067 | B1 | 8/2002 | Goldman et al. |
| 6,513,532 | B2 | 2/2003 | Mault et al. |
| 6,532,298 | B1 | 3/2003 | Cambier et al. |
| 6,736,759 | B1 | 5/2004 | Stubbs et al. |
| 6,769,767 | B2 | 8/2004 | Swab et al. |
| 6,783,501 | B2 | 8/2004 | Takahashi et al. |
| 6,790,178 | B1 | 9/2004 | Mault et al. |
| 6,812,845 | B2 | 11/2004 | Yuzuki et al. |
| 7,187,960 | B2 | 3/2007 | Abreu |
| 7,192,136 | B2 | 3/2007 | Howell et al. |
| 7,255,437 | B2 | 8/2007 | Howell et al. |
| 7,376,238 | B1 | 5/2008 | Rivas et al. |
| 7,380,936 | B2 | 6/2008 | Howell et al. |
| 7,400,257 | B2 | 7/2008 | Rivas |
| 7,401,918 | B2 | 7/2008 | Howell et al. |
| 7,438,410 | B1 | 10/2008 | Howell et al. |
| 7,454,002 | B1 | 11/2008 | Gardner et al. |
| 7,457,434 | B2 | 11/2008 | Azar |
| 7,481,531 | B2 | 1/2009 | Howell et al. |
| 7,488,294 | B2 | 2/2009 | Torch |
| 7,500,746 | B1 | 3/2009 | Howell et al. |
| 7,500,747 | B2 | 3/2009 | Howell et al. |
| 7,515,054 | B2 | 4/2009 | Torch |
| 7,543,934 | B2 | 6/2009 | Howell et al. |
| 7,581,833 | B2 | 9/2009 | Howell et al. |
| 7,621,634 | B2 | 11/2009 | Howell et al. |
| 7,630,524 | B2 | 12/2009 | Lauper et al. |
| 7,634,379 | B2 | 12/2009 | Noble |
| 7,648,463 | B1 | 1/2010 | Elhag et al. |
| 7,677,723 | B2 | 3/2010 | Howell et al. |
| 7,771,046 | B2 | 8/2010 | Howell et al. |
| 7,792,552 | B2 | 9/2010 | Thomas et al. |
| 7,793,361 | B2 | 9/2010 | Ishihara et al. |
| 7,857,772 | B2 | 9/2010 | Bouvier et al. |
| 7,806,525 | B2 | 10/2010 | Howell et al. |
| 7,922,321 | B2 | 4/2011 | Howell et al. |
| 7,987,070 | B2 | 7/2011 | Kahn et al. |
| 8,007,450 | B2 | 8/2011 | Williams |
| 8,011,242 | B2 | 9/2011 | O'Neill et al. |
| 8,081,082 | B2 | 12/2011 | Malik Nadeem et al. |
| 8,109,629 | B2 | 2/2012 | Howell et al. |
| 8,157,730 | B2 | 4/2012 | Leboeuf et al. |
| 8,188,868 | B2 | 5/2012 | Case |
| 8,202,148 | B2 | 6/2012 | Young |
| 8,294,581 | B2 | 10/2012 | Kamen |
| 8,303,311 | B2 | 11/2012 | Forest |
| 8,337,013 | B2 | 12/2012 | Howell et al. |
| 8,384,617 | B2 | 2/2013 | Braun et al. |
| 8,430,507 | B2 | 4/2013 | Howell et al. |
| 8,448,846 | B2 | 5/2013 | Needham et al. |
| 8,449,471 | B2 | 5/2013 | Tran |
| 8,465,151 | B2 | 6/2013 | Howell et al. |
| 8,494,507 | B1 | 7/2013 | Tedesco et al. |
| 8,500,271 | B2 | 8/2013 | Howell et al. |
| 8,510,166 | B2 | 8/2013 | Neven |
| 8,531,355 | B2 | 9/2013 | Maltz |
| 8,540,583 | B2 | 9/2013 | Leech |
| 8,568,313 | B2 | 10/2013 | Sadhu |
| 8,594,971 | B2 | 11/2013 | Keal et al. |
| 8,620,600 | B2 | 12/2013 | Vock et al. |
| 8,630,633 | B1 | 1/2014 | Tedesco et al. |
| 8,634,701 | B2 | 1/2014 | Kang et al. |
| 8,647,270 | B2 | 2/2014 | Leboeuf et al. |
| 8,690,750 | B2 | 4/2014 | Krueger |
| 8,696,113 | B2 | 4/2014 | Lewis |
| 8,733,928 | B1 | 5/2014 | Lewis |
| 8,750,971 | B2 | 6/2014 | Tran |
| 8,764,651 | B2 | 7/2014 | Tran |
| 8,849,610 | B2 | 9/2014 | Molettiere et al. |
| 8,892,401 | B2 | 11/2014 | Yuen et al. |
| 8,905,542 | B2 | 12/2014 | Howell et al. |
| 8,911,087 | B2 | 12/2014 | Publicover et al. |
| 8,920,332 | B2 | 12/2014 | Hong et al. |
| 8,931,896 | B2 | 1/2015 | Blum et al. |
| 8,941,560 | B2 | 1/2015 | Wong et al. |
| 8,944,590 | B2 | 2/2015 | Blum et al. |
| 8,961,415 | B2 | 2/2015 | Leboeuf et al. |
| 8,964,298 | B2 | 2/2015 | Haddick et al. |
| 8,965,730 | B2 | 2/2015 | Yuen |
| 8,979,295 | B2 | 3/2015 | Waters |
| 9,001,427 | B2 | 4/2015 | Jacobs et al. |
| 9,005,129 | B2 | 4/2015 | Venkatraman et al. |
| 9,007,220 | B2 | 4/2015 | Johns et al. |
| 9,028,405 | B2 | 5/2015 | Tran |
| 9,031,812 | B2 | 5/2015 | Roberts et al. |
| 9,033,493 | B2 | 5/2015 | Howell et al. |
| 9,035,970 | B2 | 5/2015 | Lamb et al. |
| 9,050,033 | B2 | 6/2015 | Yoneyama et al. |
| 9,064,342 | B2 | 6/2015 | Yuen et al. |
| 9,112,701 | B2 | 8/2015 | Sano et al. |
| 9,113,794 | B2 | 8/2015 | Hong et al. |
| 9,113,795 | B2 | 8/2015 | Hong et al. |
| 9,141,194 | B1 | 9/2015 | Keyes et al. |
| 9,144,405 | B2 | 9/2015 | Kim et al. |
| 9,153,074 | B2 | 10/2015 | Zhou et al. |

(56) References Cited

U.S. PATENT DOCUMENTS

| | | | |
|---|---|---|---|
| 9,215,290 B2 | 12/2015 | Yuen et al. |
| 9,235,064 B2 | 1/2016 | Lewis |
| 9,239,473 B2 | 1/2016 | Lewis |
| 9,241,635 B2 | 1/2016 | Yuen et al. |
| 9,244,293 B2 | 1/2016 | Lewis |
| 9,247,212 B2 | 1/2016 | Bose et al. |
| 9,254,100 B2 | 2/2016 | Beck et al. |
| 9,256,711 B2 | 2/2016 | Horseman |
| 9,304,331 B2 | 4/2016 | Carrara |
| 9,341,526 B2 | 5/2016 | Bass et al. |
| 9,342,610 B2 | 5/2016 | Liu et al. |
| 9,480,877 B2 | 11/2016 | Chiang et al. |
| 9,520,638 B2 | 12/2016 | Baringer et al. |
| 9,529,197 B2 | 12/2016 | Olsson et al. |
| 9,579,060 B1 | 2/2017 | Lisy et al. |
| 9,726,904 B1 | 8/2017 | Lin |
| 9,763,592 B2 | 9/2017 | Le et al. |
| 9,896,154 B2 | 2/2018 | Modolo |
| 9,977,259 B2 | 5/2018 | Archambeau et al. |
| 2001/0031031 A1 | 10/2001 | Ogawa et al. |
| 2002/0151810 A1 | 10/2002 | Wong et al. |
| 2003/0195398 A1 | 10/2003 | Suzuki et al. |
| 2005/0033200 A1 | 2/2005 | Soehren et al. |
| 2005/0036103 A1 | 2/2005 | Bloch |
| 2005/0054942 A1 | 3/2005 | Melker et al. |
| 2006/0115130 A1 | 6/2006 | Kozlay |
| 2007/0052672 A1 | 3/2007 | Ritter et al. |
| 2007/0112287 A1 | 5/2007 | Fancourt et al. |
| 2007/0273611 A1 | 11/2007 | Torch |
| 2008/0021676 A1* | 1/2008 | Vock ............... G01P 3/50 702/182 |
| 2008/0137916 A1 | 6/2008 | Lauper et al. |
| 2009/0030350 A1 | 1/2009 | Yang et al. |
| 2009/0195747 A1 | 8/2009 | Insua |
| 2009/0227853 A1 | 9/2009 | Wijesiriwardana |
| 2009/0267805 A1 | 10/2009 | Jin et al. |
| 2010/0042430 A1 | 2/2010 | Bartfeld |
| 2010/0045928 A1 | 2/2010 | Levy |
| 2010/0110368 A1 | 5/2010 | Chaum |
| 2010/0136508 A1 | 6/2010 | Zekhtser |
| 2010/0271587 A1 | 10/2010 | Pavlopoulos |
| 2010/0280336 A1 | 11/2010 | Giftakis et al. |
| 2010/0308999 A1 | 12/2010 | Chornenky |
| 2010/0332571 A1 | 12/2010 | Healey et al. |
| 2011/0169932 A1 | 7/2011 | Mula et al. |
| 2011/0221656 A1 | 9/2011 | Haddick et al. |
| 2011/0224505 A1 | 9/2011 | Sadhu |
| 2012/0021806 A1 | 1/2012 | Maltz |
| 2012/0029367 A1 | 2/2012 | Hobeika |
| 2012/0127423 A1 | 5/2012 | Blum et al. |
| 2012/0133885 A1 | 5/2012 | Howell et al. |
| 2012/0135384 A1 | 5/2012 | Nakao |
| 2012/0142443 A1 | 6/2012 | Savarese et al. |
| 2012/0169990 A1 | 7/2012 | Burnstein |
| 2012/0191016 A1 | 7/2012 | Jastram |
| 2012/0203310 A1 | 8/2012 | Pugh et al. |
| 2012/0206485 A1 | 8/2012 | Osterhout et al. |
| 2012/0310442 A1 | 12/2012 | Doutaz et al. |
| 2013/0009907 A1 | 1/2013 | Rosenberg et al. |
| 2013/0024022 A1 | 1/2013 | Bowers |
| 2013/0024211 A1 | 1/2013 | Monteforte et al. |
| 2013/0041590 A1 | 2/2013 | Bunch et al. |
| 2013/0050258 A1 | 2/2013 | Liu et al. |
| 2013/0096397 A1 | 4/2013 | Kiso et al. |
| 2013/0138413 A1 | 5/2013 | Finch et al. |
| 2013/0157232 A1 | 6/2013 | Ehrenkranz |
| 2013/0242262 A1 | 9/2013 | Lewis |
| 2013/0274587 A1 | 10/2013 | Coza et al. |
| 2013/0274904 A1 | 10/2013 | Coza et al. |
| 2013/0307670 A1 | 11/2013 | Ramaci |
| 2013/0329183 A1 | 12/2013 | Blum et al. |
| 2013/0345168 A1 | 12/2013 | Kim et al. |
| 2014/0028456 A1 | 1/2014 | Sadhu |
| 2014/0031703 A1 | 1/2014 | Rayner et al. |
| 2014/0063242 A1 | 3/2014 | Hanina et al. |
| 2014/0073081 A1 | 3/2014 | Wang |
| 2014/0078049 A1 | 3/2014 | Parshionikar |
| 2014/0085190 A1 | 3/2014 | Erinjippurath et al. |
| 2014/0135593 A1 | 5/2014 | Jayalth et al. |
| 2014/0142459 A1 | 5/2014 | Jayalth et al. |
| 2014/0159862 A1 | 6/2014 | Yang et al. |
| 2014/0204334 A1 | 7/2014 | Stoll |
| 2014/0207264 A1 | 7/2014 | Quy |
| 2014/0218281 A1 | 8/2014 | Amayeh et al. |
| 2014/0228649 A1 | 8/2014 | Rayner et al. |
| 2014/0229220 A1 | 8/2014 | Yuen et al. |
| 2014/0247145 A1 | 9/2014 | Proud |
| 2014/0266988 A1 | 9/2014 | Fisher et al. |
| 2014/0276096 A1 | 9/2014 | Bonutti |
| 2014/0340221 A1 | 11/2014 | Yuen et al. |
| 2014/0346158 A1 | 11/2014 | Matthews |
| 2014/0375452 A1 | 12/2014 | Yuen et al. |
| 2014/0375470 A1 | 12/2014 | Malveaux |
| 2014/0378872 A1 | 12/2014 | Hong et al. |
| 2015/0057512 A1 | 2/2015 | Kapoor |
| 2015/0085245 A1 | 3/2015 | Howell et al. |
| 2015/0088464 A1 | 3/2015 | Yuen et al. |
| 2015/0173631 A1 | 6/2015 | Richards et al. |
| 2015/0179050 A1 | 6/2015 | Katingari et al. |
| 2015/0185506 A1 | 7/2015 | Lewis |
| 2015/0212329 A1 | 7/2015 | Sugihara et al. |
| 2015/0223805 A1 | 8/2015 | Whitman et al. |
| 2015/0244910 A1 | 8/2015 | Marston et al. |
| 2015/0281879 A1 | 10/2015 | Saadi |
| 2015/0287338 A1 | 10/2015 | Wells et al. |
| 2015/0332149 A1 | 11/2015 | Kolb et al. |
| 2015/0342482 A1 | 12/2015 | Carrara |
| 2015/0366518 A1 | 12/2015 | Sampson |
| 2016/0007849 A1 | 1/2016 | Krueger |
| 2016/0034042 A1 | 2/2016 | Joo |
| 2016/0041404 A1 | 2/2016 | Palermo et al. |
| 2016/0041613 A1 | 2/2016 | Klanner et al. |
| 2016/0117937 A1 | 4/2016 | Penders et al. |
| 2016/0314468 A1 | 10/2016 | Smith et al. |
| 2017/0071528 A1 | 3/2017 | Chen |
| 2017/0323584 A1 | 11/2017 | Daniel et al. |

FOREIGN PATENT DOCUMENTS

| | | |
|---|---|---|
| WO | 2005094667 | 10/2005 |
| WO | 2007088374 | 8/2007 |
| WO | 2008073806 | 6/2008 |
| WO | 2010006370 | 1/2010 |
| WO | 2010062479 | 6/2010 |
| WO | 2010062481 | 6/2010 |
| WO | 2011086466 | 7/2011 |
| WO | 2012041485 | 4/2012 |
| WO | 2014021602 | 2/2014 |
| WO | 2014108481 | 7/2014 |
| WO | 2014144918 | 9/2014 |
| WO | 2014144940 | 9/2014 |
| WO | 2014170280 | 10/2014 |
| WO | 2014188244 | 11/2014 |
| WO | 2015015025 | 2/2015 |
| WO | 2015081299 | 6/2015 |
| WO | 2015095924 | 7/2015 |
| WO | 2015127143 | 8/2015 |
| WO | 2015127441 | 8/2015 |
| WO | 2016017997 | 2/2016 |
| WO | 2016029803 | 3/2016 |

OTHER PUBLICATIONS

Notice of Allowance, dated Feb. 28, 2017, from corresponding U.S. Appl. No. 14/588,122.

Office Action, dated Feb. 10, 2017, from corresponding U.S. Appl. No. 14/846,401.

Office Action, dated Mar. 3, 2017, from corresponding U.S. Appl. No. 14/610,628.

Ted Burnham, Wearable Air Quality Sensor: Tzoa, Jan. 5, 2015, Postscapes, http://www.postscapes.com/wearable-air-quality-sensor-tzoa/.

(56) References Cited

OTHER PUBLICATIONS

Final Office Action, dated Mar. 29, 2017, from corresponding U.S. Appl. No. 14/562,454.
International Preliminary Report on Patentability, dated Mar. 16, 2017, from corresponding International Application No. PCT/US2015/048612.
International Preliminary Report on Patentability, dated Mar. 16, 2017, from corresponding International Application No. PCT/US2015/048656.
International Preliminary Report on Patentability, dated Mar. 16, 2017, from corresponding International Application No. PCT/US2015/048662.
Office Action, dated Sep. 29, 2017, from corresponding U.S. Appl. No. 14/506,249.
Restriction Requirement, dated Oct. 4, 2017, from corresponding U.S. Appl. No. 14/610,439.
Office Action, dated Sep. 26, 2017, from corresponding U.S. Appl. No. 14/846,401.
Restriction Requirement, dated Sep. 13, 2017, from corresponding U.S. Appl. No. 14/550,406.
Notice of Allowance, dated Oct. 20, 2017, from corresponding U.S. Appl. No. 15/489,147.
Final Office Action, dated Nov. 16, 2017, from corresponding U.S. Appl. No. 14/610,628.
Office Action, dated Nov. 30, 2017, from corresponding U.S. Appl. No. 14/550,406.
Jeannet, Pierre-Yves, et al., "Continuous monitoring and quantification of multiple parameters of daily physical activity in ambulatory Duchenne muscular , dystrophy patients", Official Journal of the European Paediatric Neurology Society, 2011.
Notice of Allowance, dated Dec. 13, 2017, from corresponding U.S. Appl. No. 14/610,501.
Final Office Action, dated Dec. 15, 2016, from corresponding U.S. Appl. No. 14/506,249.
Final Office Action, dated Sep. 26, 2016, from corresponding U.S. Appl. No. 14/610,628.
International Search Report, dated Dec. 18, 2015, from corresponding International Application No. PCT/US2015/048662.
International Search Report, dated Jan. 21, 2016, from corresponding International Application No. PCT/US2015/048612.
International Search Report, dated Jan. 21, 2016, from corresponding International Application No. PCT/US2015/048656.
International Search Report, dated Jun. 2, 2016, from corresponding International Application No. PCT/US2016/015705.
Invitation to Pay Additional Search Fees, dated Apr. 1, 2016, from corresponding International Application Serial No. PCT/US2016/015705.
Written Opinion of the International Searching Authority, dated Jan. 21, 2016, from corresponding International Application No. PCT/US2015/048612.
Written Opinion of the International Searching Authority, dated Jan. 21, 2016, from corresponding International Application No. PCT/US2015/048656.
Written Opinion of the International Searching Authority, dated Jun. 2, 2016, from corresponding International Application No. PCT/US2016/015705.
Office Action, dated Dec. 29, 2016, from corresponding U.S. Appl. No. 14/610,589.
Phend, Crystal, "Calorie Intake Rises as Sleep Time Drops," Medpage Today, Medpage Today, LLC, Mar. 15, 2012, Web Dec. 19, 2016, http://www.medpagetoday.com/cardiology/prevention/31663.
Invitation to Pay Additional Search Fees, dated Nov. 4, 2015, from corresponding International Application Serial No. PCT/US2015/048612.
Invitation to Pay Additional Search Fees, dated Nov. 4, 2015, from corresponding International Application Serial No. PCT/US2015/048656.

Viaria S. Redin, "Marathon Man", Article Jun. 15, 1998, MIT Media Laboratory.
Office Action, dated Aug. 19, 2016, from corresponding U.S. Appl. No. 14/578,039.
Office Action, dated Jul. 1, 2016, from corresponding U.S. Appl. No. 14/562,454.
Office Action, dated Jul. 22, 2016, from corresponding U.S. Appl. No. 14/506,249.
Office Action, dated Mar. 8, 2016, from corresponding U.S. Appl. No. 14/610,628.
Office Action, dated Sep. 2, 2016, from corresponding U.S. Appl. No. 14/588,122.
Restriction Requirement, dated Nov. 10, 2016, from corresponding U.S. Appl. No. 14/846,401.
Richard M. Satava, et al., "The Physiologic Cipher at Altitude: Telemedicine and Real-Time Monitoring of Climbers on Mount Everest", Telemedicine Journal and e-Health, vol. 6, No. 3, 2000, Mary Ann Liebert, Inc.
Written Opinion of the International Searching Authority, dated Dec. 18, 2015, from corresponding International Application No. PCT/US2015/048662.
Final Office Action, dated Jun. 30, 2017, from corresponding U.S. Appl. No. 14/610,589.
Shankland, Stephen, "Google's electronic eyewear get 'OK Glass' voice commands", Feb. 20, 2013, Cnet.com, https://www.cnet.com/news/googles-electronic-eyewear-gets-ok-glass-voice-commands/.
Office Action, dated Jun. 29, 2017, from corresponding U.S. Appl. No. 15/489,147.
Final Office Action, dated Jul. 10, 2017, from corresponding U.S. Appl. No. 14/846,401.
Final Office Action, dated May 23, 2017, from corresponding U.S. Appl. No. 14/578,039.
Notice of Allowance, dated Jun. 21, 2017, from corresponding U.S. Appl. No. 14/562,454.
Office Action, dated Jun. 27, 2017, from corresponding U.S. Appl. No. 15/060,333.
Tolentino, Mellisa, Udderly Clever Wearable Tech Solutions, http://siliconangle.com/blog/2014/03/25/udderly-clever-wearable-tech-solutions/, Mar. 25, 2014.
Torres, Juan Carlos, ODG R-7 Smart Glasses Carries Its Own Android Inside, http://androidcommunity.com/odg-r-7-smart-glasses-carries-its-own-android-inside-20140919/, Sep. 19, 2014.
Office Action, dated Mar. 2, 2018, from corresponding U.S. Appl. No. 15/060,333.
Office Action, dated Mar. 9, 2018, from corresponding U.S. Appl. No. 14/610,439.
Final Office Action, dated Mar. 30 2018, from corresponding U.S. Appl. No. 14/846,401.
Office Action, dated May 23, 2018, from corresponding U.S. Appl. No. 14/578,039.
Office Action, dated Jun. 8, 2018, from corresponding U.S. Appl. No. 14/610,501.
Office Action, dated Aug. 7, 2018, from corresponding U.S. Appl. No. 14/550,406.
Notice of Allowance, dated Sep. 13, 2018, from corresponding U.S. Appl. No. 15/594,898.
Office Action, dated Sep. 11, 2018, from corresponding U.S. Appl. No. 15/060,333.
Final Office Action, dated Sep. 25, 2018, from corresponding U.S. Appl. No. 14/610,439.
Office Action, dated Oct. 4, 2018, from corresponding U.S. Appl. No. 15/791,196.
Final Office Action, dated Dec. 11, 2018, from corresponding U.S. Appl. No. 14/610,501.
Final Office Action, dated Dec. 31, 2018, from corresponding U.S. Appl. No. 14/550,406.

* cited by examiner

SYSTEMS AND METHODS FOR TRACKING MOTION, PERFORMANCE, AND OTHER DATA FOR AN INDIVIDUAL SUCH AS A WINTER SPORTS ATHLETE

CROSS REFERENCE TO RELATED APPLICATIONS

This application is a continuation-in-part of U.S. patent application Ser. No. 14/610,501, filed Jan. 30, 2015, entitled "Systems and Methods for Tracking Motion of a Bicycle or Other Vehicles" and claims the benefit of priority to U.S. Provisional Patent Application No. 62/135,660, filed Mar. 19, 2015, entitled "Systems and Methods for Tracking Motion, Performance, and Other Data for an Individual," both of which are incorporated herein by reference in their entirety.

BACKGROUND

An athlete may desire to measure and track various performance metrics related to their movement such as speed, distance traveled, etc. Current systems for tracking such metrics are limited in terms of the information that they provide and often include complex and expensive assemblies of parts. Accordingly, there is a need for improved systems and methods for tracking athletes and others.

SUMMARY

A computer-implemented method of determining individual movement for a winter sports athlete, according to various embodiments, comprises: (1) providing a mobile computing device comprising: one or more processors; a display; and one or more magnetometers; (2) providing a first magnet for placement on a piece of winter sports equipment used by the winter sports athlete; (3) measuring, by the one or more processors, using the one or more magnetometers, magnetic field information for the first magnet disposed on a portion of the piece of winter sports equipment used by the winter sports athlete; (4) determining, by the one or more processors, using the magnetic field information, one or more pieces of individual movement data associated with the winter sports athlete; (5) generating, by the one or more processors, a graphical representation of the one or more pieces of individual movement data; and (6) displaying, by the one or more processors on the display, the generated graphical representation to the winter sports athlete.

A computer system for determining and tracking performance data for a winter sports athlete, in various embodiments, comprises: (1) a memory; (2) one or more processors; (3) a display; and (4) one or more magnetometers. In various embodiments, the one or more processors are configured for: (1) measuring first magnetic field information for a first magnet disposed adjacent the winter sports athlete at a first time using the one or more magnetometers, the first magnetic field information comprising: (a) a first magnetic field strength; and (b) a first magnetic field direction; (2) storing the first magnetic field information in memory, (3) measuring second magnetic field information for the first magnet at a second time using the one or more magnetometers, the second magnetic field information comprising: (a) a second magnetic field strength; and (b) a second magnetic field direction; (4) storing the second magnetic field information in memory; (5) calculating, using at least the first magnetic field strength, the second magnetic field strength, the first magnetic field direction, and the second magnetic field direction, a change in relative position and orientation of the first magnet between the first time and the second time; (6) determining, based at least in part on the calculated relative position and orientation of the first magnet between the first time and the second time, a first position of the winter sports athlete at the first time and a second position of the winter sports athlete at the second time; (7) generating a graphical representation of the winter sports athlete at the first position and the second position; and (8) displaying the generated graphical representation on the display.

A computer system for determining and tracking performance data for a winter sports athlete, according to particular embodiments, comprises: (1) a memory; (2) one or more processors; (3) a display; (4) one or more global positioning sensors; (5) one or more altimeters; and (6) one or more magnetometers. In particular embodiments, the display, one or more global positioning sensors, one or more altimeters (e.g., digital altimeters), and one or more magnetometers are operatively coupled to the processor. In some embodiments, the one or more processors are configured for: (1) continuously measuring instantaneous magnetic field information for a first magnet disposed on a piece of equipment worn by the winter sports athlete over a period of time using the one or more magnetometers, the instantaneous magnetic field information comprising: (a) instantaneous magnetic field strength; and (b) instantaneous magnetic field direction; (2) storing a plurality of the measured instantaneous magnetic field information over the period of time in memory; (3) continuously determining an instantaneous position of the winter sports athlete over the period of time using the one or more global positioning sensors; (4) storing a plurality of the determined instantaneous positions over the period of time in memory; (5) continuously measuring an instantaneous altitude of the winter sports athlete over the period of time using the one or more altimeters; (6) storing a plurality of the measured instantaneous altitudes over the period of time in memory; (7) continuously determining, for each of a plurality of points of time over the period of time, using at least the plurality of measured instantaneous magnetic field information, the plurality of instantaneous positions, and the plurality of instantaneous altitudes: (a) a location of the winter sports athlete; (b) a velocity of the winter sports athlete; (c) an acceleration of the winter sports athlete; and (d) a position the piece of equipment worn by the winter sports athlete; (8) generating a graphical representation of the location of the winter sports athlete, the velocity of the winter sports athlete, the acceleration of the winter sports athlete, and the position of the piece of equipment worn by the winter sports athlete over the period of time; and (9) displaying the generated graphical representation on the display.

BRIEF DESCRIPTION OF THE DRAWINGS

Various embodiments of a system and method for determining, tracking, and storing performance and movement information for one or more vehicles are described below. In the course of this description, reference will be made to the accompanying drawings, which are not necessarily drawn to scale, and wherein.

DETAILED DESCRIPTION

Figure 1:
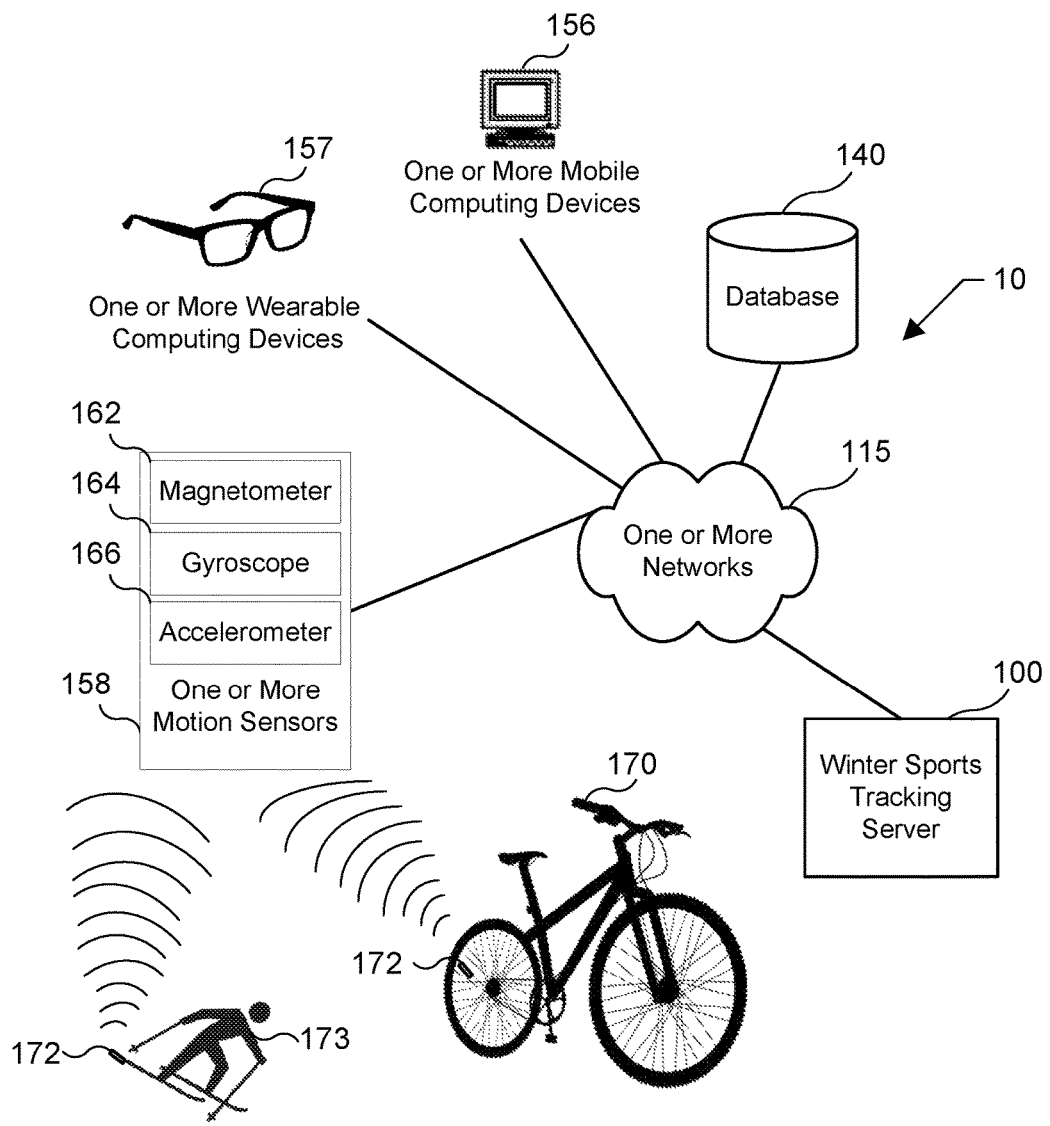
FIG. 1 is a block diagram of a winter sports tracking system in accordance with an embodiment of the present system.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In various embodiments, a system for tracking ski, snowboard, or other vehicle movement, speed, and other performance metrics comprises one or more magnetometers, and one or more magnets disposed on a particular portion of ski or snowboarding equipment worn by a skier or snowboarder (e.g., a particular ski or skis, bindings, boots, etc.). In particular embodiments, the one or more magnetometers may be embedded in any suitable computing device such as, for example, a suitable mobile computing device (e.g., a smartphone, tablet, or stand-alone winter sports tracking device), a suitable wearable computing device (e.g., wristband, wristwatch, pair of eyewear, etc.), or any other suitable device.

In various embodiments, the system is configured to determine and track movement data for the winter sport athlete based at least in part on magnetic field information associated with the one or more magnets determined by the one or more magnetometers. In a particular embodiment, the winter sports tracking system is configured to determine and track movement data for the skier or snowboarder such as, for example, linear speed and/or acceleration of the skier or snowboarder (e.g., relative to a support surface such as the Earth), angular speed and/or acceleration of the skier or snowboarder (e.g., or one or more of their skis or snowboard), altitude or change in altitude of the skier or snowboarder (e.g., or one or more skis or snowboards), angle of incline and/or decline of the skier or snowboarder (e.g., or one or more skis or snowboards), direction of travel of the skier or snowboarder (e.g., or one or more skis or snowboards), distance traveled by the skier or snowboarder (e.g., or one or more skis or snowboards), or any other suitable metric related to movement of the skier or snowboarder (e.g., or one or more skis or snowboards).

In various embodiments, the system is configured to use magnetic field information determined by the one or more magnetometers in combination with information determined by one or more other sensors, such as one or more athlete health sensors. In various embodiments, the one or more other sensors may include, for example, one or more accelerometers, one or more gyroscopes, one or more digital compasses, one or more heart rate monitors, one or more pressure sensors, etc. to determine information such as, for example: (1) a start or a stop time for a particular activity performed on skis or on a snowboard (e.g., such as a race); (2) an energy expenditure of a skier or snowboarder; (3) a total ski or snowboard time for the skier or snowboarder; and/or (4) any other suitable information or feedback associated with the skier or snowboarder (e.g., or one or more skis or snowboards worn by a skier or snowboarder).

In various embodiments, the system is particularly useful for tracking distance traveled, speed, direction, etc. for a skier or snowboarder (e.g., or one or more skis or a snowboard) that is not traveling on a fixed path. In various embodiments, the system may offer a method for tracking ski or snowboard distance traveled and other measures without having to rely on a distance of a particular trail or path on which the skier or snowboarder is or was traveling.

In various embodiments, the system is configured to display ski or snowboard movement data and other information to a user (e.g., such as the skier or snowboard), for example, on a display associated with a computing device in which the one or more magnetometers are embedded or on any other suitable display. Although the winter sports tracking system is generally described herein in the context of skiing or snowboarding, it should be understood that the winter sports tracking system may be used to determine movement, speed, and other data for any other suitable vehicle or winter sports activity (e.g., such as snowmobiling, ice skating, snowshoeing, cross-country skiing, dog sledding, etc.).

Exemplary Technical Platforms

As will be appreciated by one skilled in the relevant field, the present invention may be, for example, embodied as a computer system, a computer-implemented method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a winter sports tracking system 10 according to a particular embodiment. As may be understood from this figure, the winter sports tracking system 10 includes one or more computer networks 115, a winter sports tracking server 100, a database 140, and one or more mobile computing devices 156 (e.g., such as a smart phone, a tablet computer, a laptop computer, etc.), one or more wearable computing devices 157 (e.g., such as a pair of eyewear, a wristwatch, etc.), and/or one or more motion sensors 158, which may, in various embodiments, be integrated with the one or more mobile computing devices 156 or the one or more wearable computing devices 157. In particular embodiments, the one or more computer networks 115 facilitate communication between the winter sports tracking server 100, database 140, one or more mobile computing devices 156, one or more wearable computing device 157, and one or more motion sensors 158.

In various embodiments, the winter sports tracking system 10 further comprises one or more magnets 172 disposed (e.g., mounted on) a vehicle 170 (e.g., such as a bicycle, pair of skis, snowboard, etc.). In other embodiments, the one or more magnets 172 may be disposed in any other suitable location such as on an individual (e.g., on the skiers boots, gloves, helmet, etc.) or piece of equipment (e.g., such as a pair of skis, the ski poles, etc.). In various embodiments, the one or more magnets 172 may include any suitably shaped magnet, such as, for example, one or more suitable bar magnets, one or more suitable disk magnets, or one or more magnets having any other suitable shape. In various embodiments, the one or more magnets 172 may comprise, for example, one or more rare-earth magnets (e.g., one or more neodymium iron boron magnets, one or more samarium cobalt magnets, etc.), one or more alnico magnets, one or more ceramic magnets, one or more ferrite magnets, or any other magnet comprising any other suitable material. In other embodiments, the one or more magnets 172 may comprise any suitable component capable of generating a magnetic field that is sufficiently strong such that the magnetometer 162 is capable of detecting the magnetic field. In still other embodiments, the one or more magnets 172 may comprise one or more suitable electromagnets, which may, for example, include any suitable electromagnet configured to generate (e.g., produce) a magnetic field by one or more electric currents. In embodiments in which the one or more magnets 172 comprise one or more electromagnets, the one or more magnets 172 may comprise one or more coils of wire and one or more power sources (e.g., one or more suitable batteries).

The one or more computer networks 115 may include any of a variety of types of wired or wireless computer networks such as the Internet, a private intranet, a mesh network, a public switch telephone network (PSTN), or any other type of network (e.g., a network that uses Bluetooth, Low Energy Bluetooth, or near field communications to facilitate communication between computers). The communication link between the winter sports tracking server 100 and the database 140 may be, for example, implemented via a Local Area Network (LAN) or via the Internet. The communication link between the one or more mobile computing devices 156 and the one or more motion sensors 158 may be, for example, implemented via Low Energy Bluetooth.

As may be understood from FIG. 1, the one or more motion sensors 158 may include, for example, a magnetometer 162 (e.g., one or more magnetometers), a gyroscope 164 (e.g., one or more gyroscopes), and/or an accelerometer 166 (e.g., one or more accelerometers). In particular embodiments, the magnetometer 162 may include any suitable magnetometer such as, for example, a suitable Microelectromechanical systems (MEMs) magnetometer (e.g., such as a Lorentz-force-based MEMs magnetometer). In other embodiments, the magnetometer 162 may include any suitable 2-axis magnetometer or 3-axis magnetometer. In other embodiments, the magnetometer 162 may include any suitable 2-axis, 3-axis, 6 axis, or 9-axis sensor comprising one or more magnetometers, one or more accelerometers, and/or one or more gyroscopes. In still other embodiments, the magnetometer 162 may include any other suitable sensor or magnetometer having any suitable number of axes. In still other embodiments, the magnetometer 162 comprises any suitable device configured for measuring a strength and direction of a magnetic field.

Figure 2:
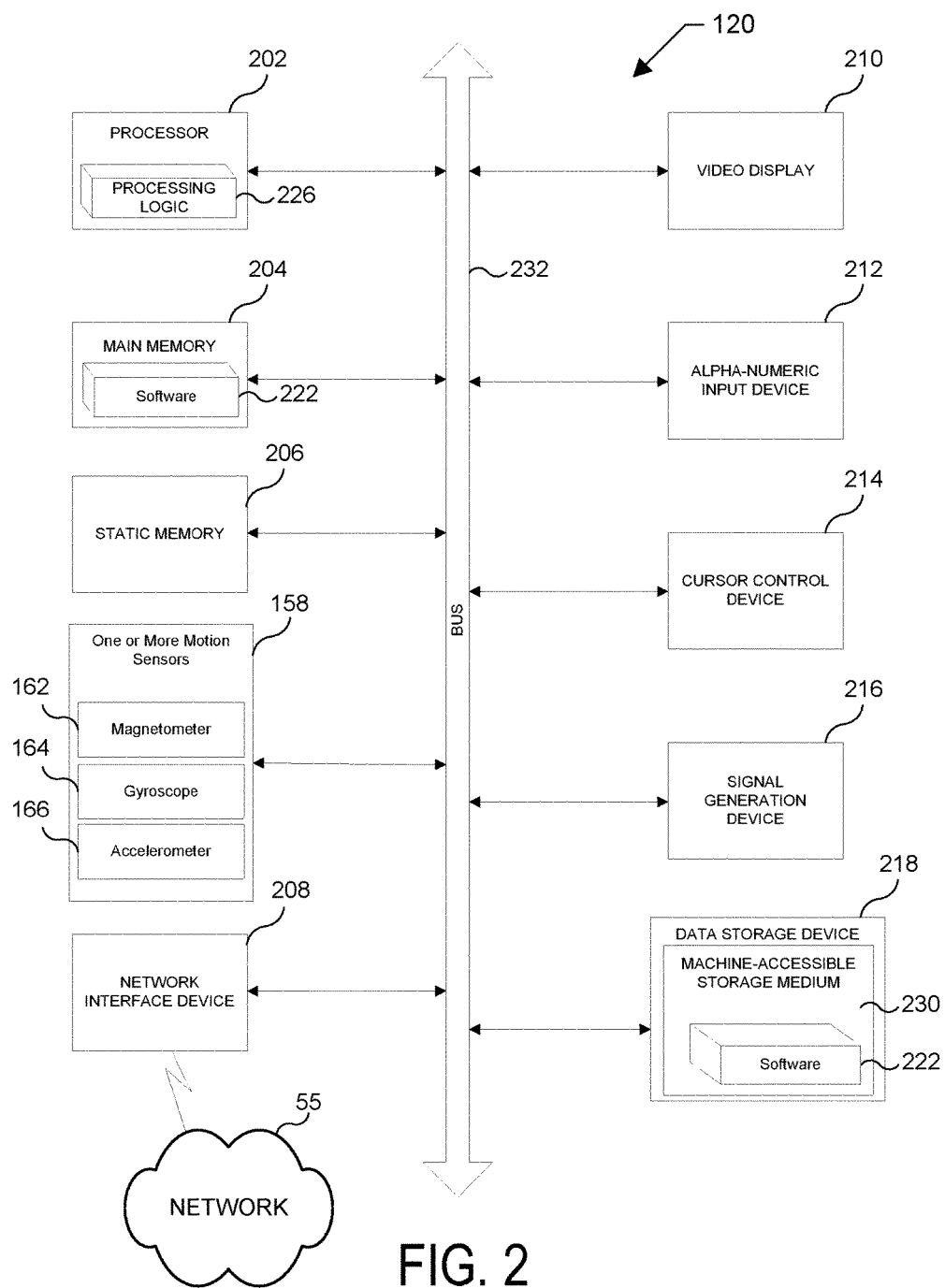
FIG. 2 is a schematic diagram of a computer, such as the winter sports tracking server of FIG. 1, that is suitable for use in various embodiments.

FIG. 2 illustrates a diagrammatic representation of a computer architecture 120 that can be used within the winter sports tracking system 10, for example, as a client computer (e.g., one of the one or more mobile computing devices 154, 156 shown in FIG. 1), or as a server computer (e.g., winter sports tracking server 100 shown in FIG. 1). In particular embodiments, the computer 120 may be suitable for use as a computer within the context of the winter sports tracking system 10 that is configured for determining, tracking, and storing vehicle 170 movement information and providing access to the information to one or more users in the context of the system.

In particular embodiments, the computer 120 may be connected (e.g., networked) to other computers in a LAN, an intranet, an extranet, and/or the Internet. As noted above, the computer 120 may operate in the capacity of a server or a client computer in a client-server network environment, or as a peer computer in a peer-to-peer (or distributed) network environment. The computer 120 may be a desktop personal computer (PC), a tablet PC, a set-top box (STB), a Personal Digital Assistant (PDA), a cellular telephone, a wearable computing device (e.g., such as a wearable computing device embodied as a wristwatch, pair of eyewear, or other suitable wearable computing device), a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 120 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 120 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker). In various embodiments, the computer 120 may include one or more motion sensors 158, which may, for example, be integrating into the computer 120. In various embodiments, the one or more motion sensors 158 comprise a magnetometer 162 (e.g., one or more magnetometers), a gyroscope 164 (e.g., one or more gyroscopes), an accelerometer 166 (e.g., one or more accelerometers), or any other suitable motion sensor described herein.

The data storage device 218 may include a non-transitory computer-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within the main memory 204 and/or within the processing device 202 during execution thereof by the computer 120—the main memory 204 and the processing device 202 also constituting computer-accessible storage media. The software 222 may further be transmitted or received over a network 115 via a network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary Wearable Computing Device

Figure 3:
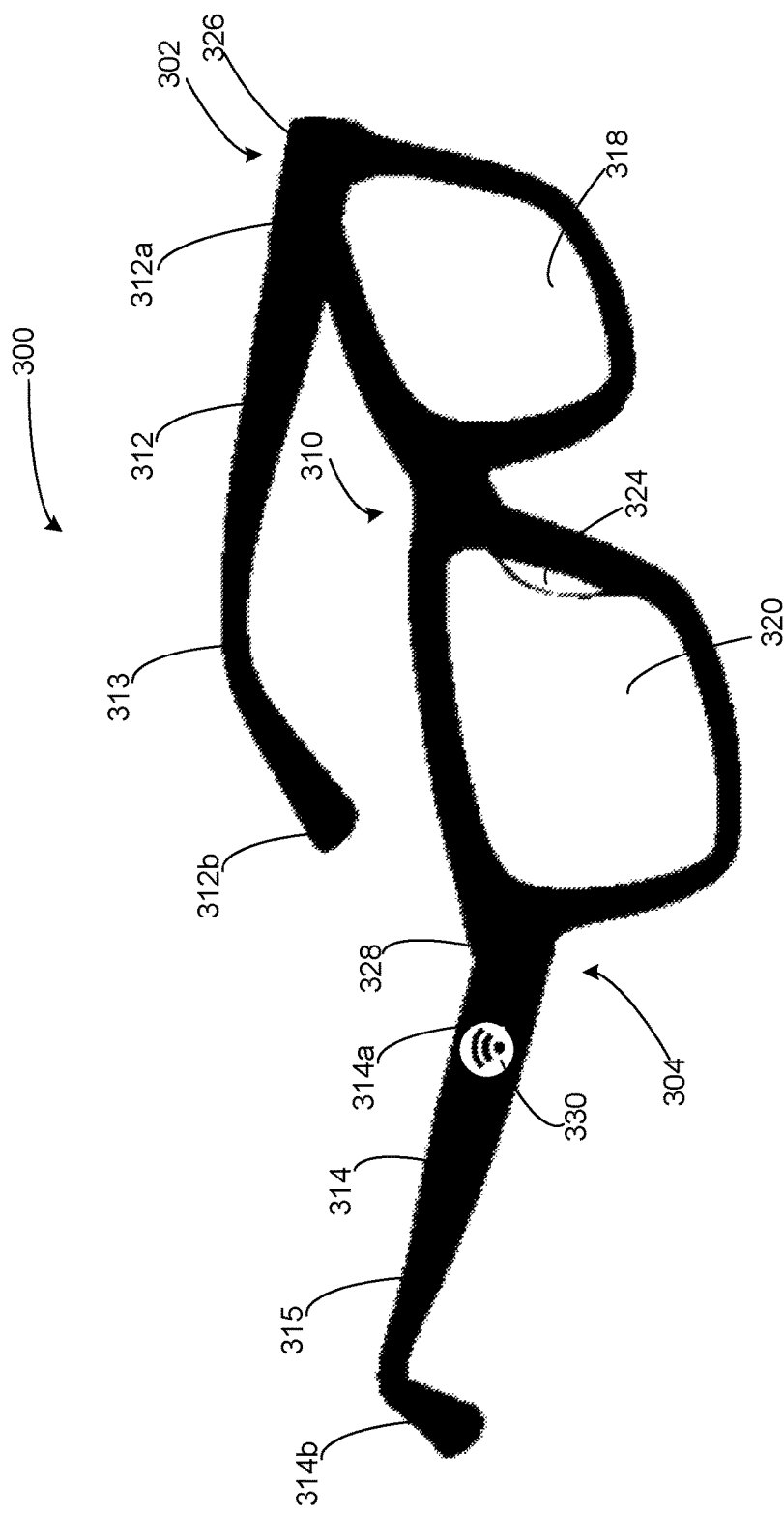
FIG. 3 is an exemplary wearable computing device as shown in FIG. 1.

As shown in FIG. 1, the winter sports tracking system 10, in various embodiments, comprises one or more wearable computing devices 157. A particular embodiment of a wearable computing device 300 is shown in FIG. 3. As shown in this figure, eyewear 300, according to various embodiments, includes: (1) an eyewear frame 310; (2) a first temple 312; and (3) a second temple 314. These various components are discussed in more detail below.

Eyewear Frame

Referring still to FIG. 3, eyewear 300, in various embodiments, includes any suitable eyewear frame 310 configured to support one or more lenses 318, 320. In the embodiment shown in this figure, the eyewear frame 310 has a first end 302 and a second end 304. The eyewear frame 310 may be made of any suitable material such as metal, ceramic, polymers or any combination thereof. In particular embodiments, the eyewear frame 310 is configured to support the first and second lenses 318, 320 about the full perimeter of the first and second lenses 318, 320. In other embodiments, the eyewear frame 310 may be configured to support the first and second lenses 318, 320 about only a portion of each respective lens. In various embodiments, the eyewear frame 310 is configured to support a number of lenses other than two lenses (e.g., a single lens, a plurality of lenses, etc.). In particular embodiments, the lenses 318, 320 may include prescription lenses, sunglass lenses, or any other suitable type of lens (e.g., reading lenses, non-prescription lenses), which may be formed from glass or polymers.

The eyewear frame 310 includes a first and second nose pad 322 (not shown in figure), 324, which may be configured to maintain the eyewear 300 adjacent the front of a wearer's face such that the lenses 318, 320 are positioned substantially in front of the wearer's eyes while the wearer is wearing the eyewear 300. In particular embodiments, the nose pads 322, 324 may comprise a material that is configured to be comfortable when worn by the wearer (e.g., rubber, etc.). In other embodiments, the nose pads may include any other suitable material (e.g., plastic, metal, etc.). In still other embodiments, the nose pads may be integrally formed with the frame 210.

The Eyewear Frame 310 includes a First and Second Hinge 326, 328 that Attach the First and second temples 312, 314 to the frame first and second ends 302, 304, respectively. In various embodiments, the hinges may be formed by any suitable connection (e.g., tongue and groove, ball and socket, spring hinge, etc.). In particular embodiments, the first hinge 326 may be welded to, or integrally formed with, the frame 310 and the first temple 312 and the second hinge 328 may be welded to, or integrally formed with, the frame 310 and the second temple 314.

First and Second Temples

As shown in FIG. 3, the first temple 312, according to various embodiments, is rotatably connected to the frame 310 at a right angle to extend the first temple 312 substantially perpendicular, substantially parallel, or anywhere in between the right angle to the frame 310. The first temple 312 has a first and second end 312a, 312b. Proximate the first temple second end 312b, the first temple 312 includes an earpiece 313 configured to be supported by a wearer's ear. Similarly, the second temple 314, according to various embodiments, is rotatably connected to the frame 310 at a right angle to extend the second temple 314 substantially perpendicular, substantially parallel, or anywhere in between the right angle to the frame 310. The second temple 314 has a first and second end 314a, 314b. Proximate the second temple second end 314b, the second temple 314 includes an earpiece 315 configured to be supported by a wearer's ear.

Sensors

In various embodiments, the second temple 314 has one or more sensors 330 connected to the second temple 314. In various embodiments, the one or more sensors 330 may be coupled to the frame 310, the first and second temples 312, 314, the first and second lenses 318, 320, or any other portion of the eyewear 300 in any suitable way. For instance, the one or more sensors 330 may be embedded into the eyewear 300, coupled to the eyewear 300, and/or operatively coupled to the eyewear 300. In various embodiments, the one or more sensors 330 may be formed at any point along the eyewear 300. For instance, a fingerprint reader may be disposed adjacent the first temple 312 of the eyewear 300. In various embodiments, the one or more sensors 330 may be formed in any shape. In addition, the one or more sensors 330 may be formed on the inner (back) surface of the frame 310, the first and second temples 312, 314, the first and second lenses 318, 320, or any other portion of the eyewear 300. In other embodiments, the one or more sensors 330 may be formed on the outer (front) surface of the frame 310, the first and second temples 312, 314, the first and second lenses 318, 320, or any other portion of the eyewear 300.

In various embodiments, the one or more sensors 330 that are coupled to the eyewear (or other wearable device) are adapted to detect one or more characteristics of the eyewear or a wearer of the eyewear. In various embodiments, the one or more sensors 330 coupled to the eyewear or other wearable computing device may include, for example, one or more of the following: a near-field communication sensor, a Bluetooth chip, a GPS unit, an RFID tag (passive or active), a fingerprint reader, an iris reader, a retinal scanner, a voice recognition sensor, a heart rate monitor, an electro-cardiogram (EKG), a pedometer, a thermometer, a front-facing camera, an eye-facing camera, a microphone, an accelerometer, a magnetometer, a blood pressure sensor, a pulse oximeter, a skin conductance response sensor, any suitable biometric reader, or any other suitable sensor. In a particular embodiment, the one or more sensors 330 include the one or more motion sensors 158 shown in FIG. 1. In some embodiments, the one or more sensors 330 may include a unique shape, a unique code, or a unique design physically inscribed into the eyewear that may be readable by an individual or a remote computing device. In particular embodiments, the sensors 330 coupled to the eyewear may include one or more electronic communications devices such as a near field communication sensor, a Bluetooth chip, an active RFID, and a GPS unit.

In various embodiments, the one or more sensors 330 are coupled to a computing device that is associated with (e.g., embedded within, attached to) the eyewear 300 or other wearable device. In particular embodiments, the eyewear 300 or other wearable device comprises at least one processor, computer memory, suitable wireless communications components (e.g., a Bluetooth chip), and a power supply for powering the wearable device and/or the various sensors.

Returning to FIG. 1, in particular embodiments, the system 10 is configured to receive input from a user (e.g., a wearer of the eyewear) via one or more gestures, for example, using at least one of the sensors 330 described immediately above. In various embodiments, the system 10 may, for example, be configured to: (1) identify a gesture performed by the user; and (2) at least partially in response to identifying the gesture, perform a function associated with the gesture. In particular embodiments, the system 10 may be configured to perform a particular function in response to identifying a particular gesture, where the particular gesture is associated with the particular function. In particular embodiments, the system 10 may be configured to enable the user to provide one or more gestures for performing a particular function. In such embodiments, the system may, for example: (1) receive a selection of a particular function from the user; (2) receive input of one or more gestures from the user; and (3) associate the particular function with the one or more gestures.

In various embodiments, the one or more gestures may include, for example: (1) one or more hand gestures (e.g., a thumbs up, a wave, two thumbs up, holding up any particular number of fingers, making one or more fists, performing a particular movement with one or more hands or fingers, etc.); (2) one or more head movements (e.g., shaking of the user's head, a nod, etc.); (3) one or more eye movements (e.g., looking in a particular direction for a particular period of time, a wink, blinking, blinking in a particular pattern, etc.); (4) one or more facial movements (e.g., a smile, a frown, sticking a tongue out, etc.); and/or (5) any suitable combination of these or any other suitable gestures.

In particular embodiments, the system 10 is configured to identify the one or more gestures, for example, using a suitable imaging device (e.g., camera) that is part of the system. In particular embodiments, the imaging device may be directed toward an area in front of the user while the user is wearing the eyewear 300 and configured to identify gestures performed by the user's hands, arms, feet, legs, etc. In other embodiments, the system 10 may include an imaging device directed toward the user's face and/or eyes while the user is wearing the eyewear 300 that is configured to identify gestures performed by the user's face and/or eyes. In other embodiments, the system 10 comprises one or more gyroscopes and/or accelerometers configured to determine a position or change in position of the eyewear 300 while the user is wearing the eyewear 300. In such embodiments, the one or more gyroscopes and/or accelerometers are configured to identify one or more gestures performed by the user that include one or more gestures that include movement of the user's head. In still other embodiments, the system comprises one or more gyroscopes and/or one or more accelerometers disposed on any other portion of the user's body configured to identify any gesture performed by the user using the other portion of the user's body (e.g., arm, hand, leg, foot, etc.). In various embodiments, the system comprises any other suitable sensor for identifying one or more gestures performed by the user.

In various embodiments, the eyewear 300 may be embodied as any suitable eyewear such as a pair of ski/snowboard goggles, or any other suitable eyewear. In such embodiments, the eyewear 300 may comprise one or more features that are similar to the eyewear described herein. In other embodiments, the eyewear 300 may include one or more features that differ at least partially from the pair of eyewear described herein. For example, in embodiments in which the eyewear 300 comprises a pair of ski or snowboard goggles, the eyewear 300 may comprise a suitable strap for maintaining the eyewear adjacent a wearer's head. In other embodiments in which the eyewear includes a pair of ski or snowboard goggles, the eyewear may comprise a single lens (e.g., as opposed to two separate lenses), different configurations of an eyewear frame, etc.

Exemplary System Platform

Various embodiments of a winter sports tracking system 10 may be implemented within the context of any suitable sport and sports equipment. Although in the embodiment of the winter sports tracking system 10 described below, the winter sports tracking system 10 is described in the context of ski or snowboard equipment, it should be understood that the winter sports tracking system may be implemented and utilized on any suitable motorized or non-motorized (e.g., human-powered) vehicle such as, for example: (1) any suitable single wheeled vehicle (e.g., such as a wheelbarrow, unicycle, etc.); (2) any suitable two-wheeled vehicle (e.g., such as a bicycle, motorcycle, cart, etc.); (3) any suitable three-wheeled vehicle (e.g., such as a tricycle, three-wheeled automobile, etc.); (4) any suitable four-wheeled vehicle (e.g., such as an automobile, truck, skateboard, snow mobile, etc.); and/or (5) any other suitable vehicle having any other suitable number of wheels (e.g., such as a street luge board, a pair of rollerblades or roller-skates, etc.); and/or (6) any other vehicle which may not include wheels (e.g., such as a snowmobile, tank, pair of ice skates) or any equipment which an individual or individuals may utilize during any suitable activity. Various aspects of the system's functionality may be executed by certain system modules, including a winter sports tracking module 400, which may, for example, be executed by a software application running on a suitable mobile computing device (e.g., a cellular phone or tablet computer), a suitable wearable computing device (e.g., a wristwatch, pair of eyewear such as ski/snowboard goggles, etc.) or other computing device. In particular embodiments, the suitable computing device comprises at least one magnetometer. This module is discussed in greater detail below.

Winter Sports Tracking Module

Figure 4:
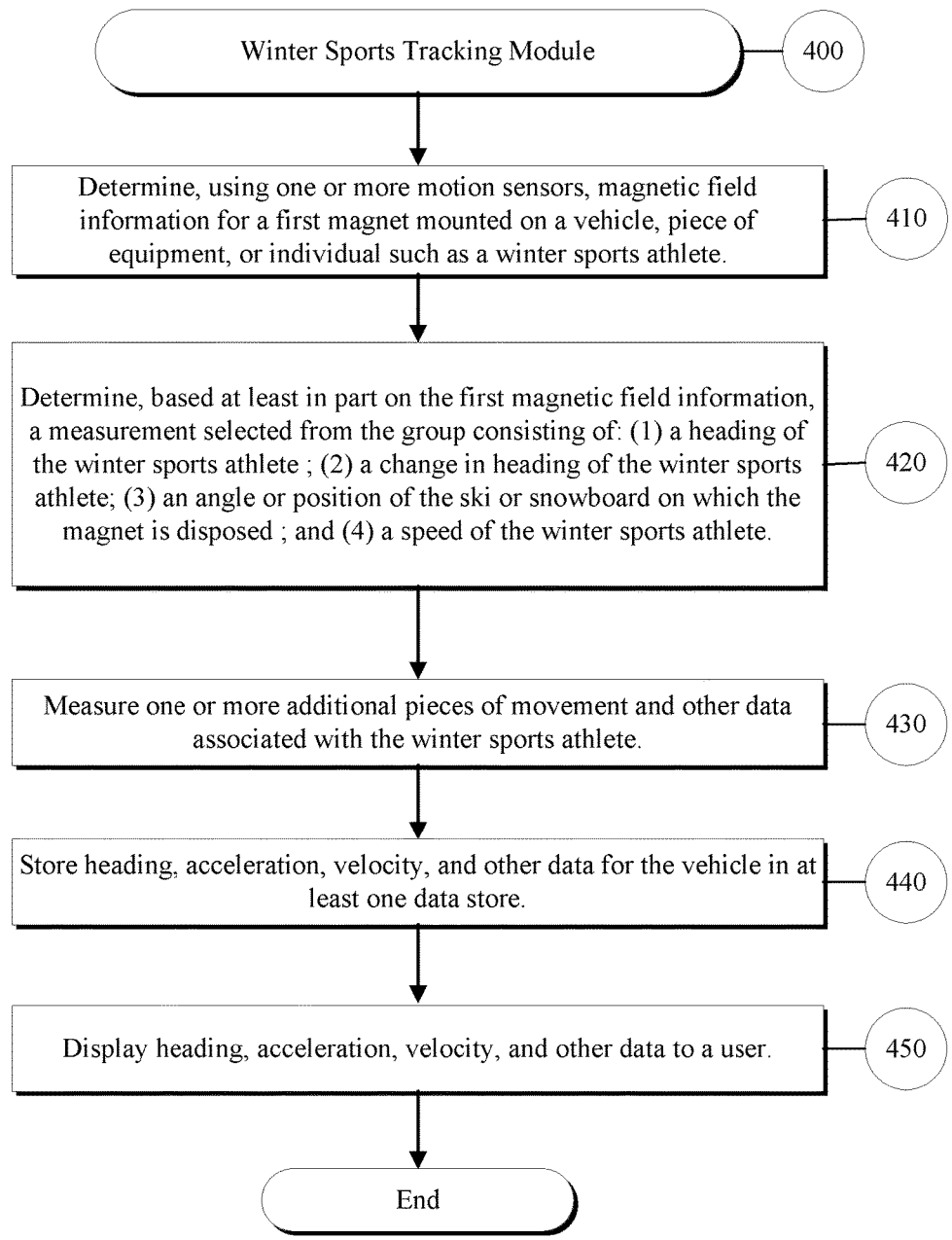
FIG. 4 depicts a flow chart that generally illustrates various steps executed by a Winter Sports Tracking Module that, for example, may be executed by the winter sports tracking server of FIG. 1.

As shown in FIG. 4, when executing the winter sports tracking module 400, the system begins, at Step 410, by determining, using one or more motion sensors, magnetic field information for a first magnet mounted on a vehicle (e.g., a bicycle), piece of equipment (e.g., such as sports equipment, skis, ski poles, ski helmet, goggles, snowboard, etc.), or individual such as a winter sports athlete (e.g., a skier or snowboarder). In particular embodiments, determining the magnetic field information comprises measuring the magnetic field information for the first magnet using one or more magnetometers. In various embodiments, the piece of equipment may include any suitable piece of equipment worn by an individual who may desire to track and/or view information related to a particular activity in which they are participating. For example, the first magnet may be mounted on any suitable portion of any suitable piece of ski or snowboard equipment such as, for example, one or more skis, one or more ski poles, one or more ski or snowboard boots, one or more ski or snowboard bindings, a helmet, etc.

In particular embodiments, the one or more motion sensors may include, for example: (1) one or more magnetometers; (2) one or more accelerometers; and/or (3) one or more gyroscopes. In some embodiments, the one or more motion sensors comprise at least one magnetometer. In a particular embodiment, the at least one magnetometer comprises at least one MEMs Bluetooth Low Energy magnetometer. In various embodiments, the one or more motion sensors are embedded in (e.g., integrated with) a mobile computing device. In particular embodiments the mobile computing device may comprise any suitable mobile computing device such as, for example, a smartphone, tablet computer, self-contained tracking device, wearable computing device (e.g., a pair of eyewear such as glasses or goggles, a bracelet, a watch, a helmet), etc.

In various embodiments, the magnetic field information determined by the one or more motion sensors includes a strength and a direction of the magnetic field of the first magnet. In other embodiments, the magnetic field information includes an absolute heading of the first magnet's magnetic field with respect to Earth's magnetic north, or any other suitable reference direction. In still other embodiments, the system is configured to determine the magnetic field information based at least in part on a magnetic field produced by the first magnet. In particular embodiments, the system is configured to substantially continuously (e.g., continuously) determine the magnetic field information for the first magnet. The system may, for example, substantially continuously record the magnetic field information and store the magnetic field information in a suitable database (e.g., in a local data store associated with the first magnetometer, in a local data store associated with a suitable mobile computing device, and/or any other suitable data store such as a remote data store).

In particular embodiments, the first magnet is disposed on a particular portion of a winter sports athlete or their equipment. For example, in a particular embodiment, the first magnet is disposed on a particular portion of the skier or snowboarder's body or clothing. In still other embodiments, the first magnet is disposed on a suitable portion of the skier or snowboarder's equipment (e.g., such as on a first or second ski, on a snowboard, on a first or second ski or snowboard boot, on a first or second ski or snowboard binding, on a first or second ski pole, etc.). In still other embodiments, the first magnet may be disposed such that the first magnet's magnetic field is substantially parallel (e.g., parallel) to a particular ski or to a snowboard (e.g., parallel to a length of the ski or snowboard). In still other embodiments, the first magnet may be disposed on the winter sports athlete's boot such that the first magnet's magnetic field is oriented substantially parallel (e.g., parallel) to the athlete's foot while the athlete is wearing the boot. In various embodiments, the first magnet may be disposed on any suitable portion of the winter sports athlete, clothing worn by the winter sports athlete, or equipment used by the winter sports athlete.

Returning to FIG. 4, the system continues at Step 420 by determining, based at least in part on the first magnetic field information, a measurement selected from a group consisting of: (1) a heading of the winter sports athlete (e.g., a direction in which the winter sports athlete is traveling); (2) a change in heading of the winter sports athlete; (3) an angle or position of the ski or snowboard on which the magnet is disposed (e.g., an angle between the ski or snowboard and a support surface (e.g., snow); and (4) a speed of the winter sports athlete. In particular embodiments, the system is configured to determine a substantially instantaneous heading of the winter sports athlete (e.g., a direction in which the winter sports athlete is currently traveling) using the first magnetic field information. In such embodiments, the heading of the winter sports athlete may include a direction relative to a fixed direction (e.g., relative to magnetic north), for example, in degrees (e.g., between about 0 degrees and about 360 degrees where 0 degrees is magnetic north). In particular embodiments, the heading may also include an angle of incline or decline of the winter sports athlete (or a ski or snowboard the winter sports athlete is currently using), for example, when the winter sports athlete is traveling up or downhill. In a particular example, the system may be configured to determine that the winter sports athlete is traveling downhill at a slope of a particular number of degrees or uphill at a slope of a particular number of degrees. In various embodiments, the system is configured to substantially continuously determine the heading of the winter sports athlete. In some embodiments, the system is configured to track the heading of the winter sports athlete over time. In such embodiments, the system may be configured to determine a path or course traveled by the winter sports athlete from a particular starting point based at least in part on determined heading information (e.g., in addition to information associated with a starting point of the winter sports athlete).

In still other embodiments, the system is configured to use the magnetic field information (e.g., instantaneous magnetic field information) to calculate and/or determine: (1) a substantially current speed of the skier (or snowboarder); (2) a maximum speed of the skier (or snowboarder); (3) an acceleration of the skier (or snowboarder); (4) an air time of the skier (or snowboarder); (5) revolutions of the skier (or snowboarder); (6) one or more tricks performed by the skier (e.g., one or more backflips, one or more front flips, one or more spins such as a 360 degree spin, crossing their skis in mid-air, etc.); (7) a number of falls by the skier (or snowboarder); (8) a distance covered by the skier (or snowboarder); (9) a number of vertical feet skied by the skier (or snowboarder); (10) a heart rate of the skier; (11) a change in heart rate of the skier (e.g., at different speeds); (12) a smoothness and symmetry of turns performed by the skier (or snowboarder); (13) a loss of speed of the skier (or snowboarder) as a result of particular turns or maneuvers (e.g., from turning too sharply); and (14) any other suitable piece of data related to skiing (or snowboarding).

In still other embodiments, such as embodiments in which the winter sports athlete is a skier or snowboarder, the system is configured to use the magnetic field information to determine: a position and/or orientation of a particular ski or snowboard at a particular point in time; a relative position and/or orientation of a first ski with respect to a second ski; the relative position and/or orientation of one or both ski poles with respect to the one or more skis, or any other suitable position information related to the snowboard or skis, the athletes arms, legs, and/or helmet that the winter sports athlete is using.

In a particular embodiment, the system, when determining the magnetic field information, is configured to: (1) receive a first magnetic field measurement for the first magnet at a first time from the one or more motion sensors (e.g., the one or more magnetometers); and (2) receive a second magnetic field measurement for the first magnet at a second time from the one or more motion sensors (e.g., the one or more magnetometers). In various embodiments, the first and second magnetic field measurements comprise a strength and a direction of the first magnet's magnetic field at the time at which the magnetic field measurement was taken (e.g., at the first or second time). In various embodiments, the system is configured to: (1) determine a first position of the winter sports athlete at the first time based at least in part on the first magnetic field measurement; and (2) determine a second position of the winter sports athlete at the second time based at least in part on the second magnetic field measurement. The system is then, in particular embodiments, configured to determine the velocity of the winter sports athlete based at least in part on a difference in the first and second positions and the time elapsed between the first and second time. In various embodiments, the system is configured to determine a change in position of the winter sports athlete (e.g., or a snowboard or ski the winter sports athlete is riding) at a particular time based at least in part on the magnetic field information, an orientation of the first magnet on the ski or snowboard, or using any other suitable technique.

In particular embodiments, the system is configured to utilize any suitable regression technique to determine an instantaneous velocity, instantaneous acceleration, or instantaneous heading of: (1) the winter sports athlete; (2) each individual ski the winter sports athlete is riding; (3) a snowboard the winter sports athlete is riding; and/or (4) any other suitable piece of equipment, clothing, or portion of the winter sports athlete's body (e.g., ski pole, legs, arms, etc.). The system may, for example, use any suitable regression technique using any suitable number of data points (e.g., any suitable number of magnetic field measurements taken over any suitable period of time). In various embodiments, an increase in a frequency of taking magnetic field measurements may improve an accuracy of a determined instantaneous velocity or other measurement. In particular embodiments, the system is configured to take a plurality of magnetic field measurements over a particular period of time.

In various embodiments, the system is further configured to determine, based at least in part on determined velocities and headings over a particular period of time, a total distance traveled by the winter sports athlete. In still other embodiments, the system is configured to determine an angle of approach for particular turns taken by the winter sports athlete based at least in part on the determined headings (e.g., instantaneous directions of travel) of the winter sports athlete. In still other embodiments, the system is configured to determine a total distance climbed and/or descended by the winter sports athlete during a particular period of time.

In particular embodiments, the system is configured to generate, based at least in part on the heading and speed data, a visual representation of a path traveled by the winter sports athlete over a particular period of time. The system may, for example, generate a two-dimensional or three-dimensional image that includes a line or other indication of a path traveled by the winter sports athlete. The generated visual representation may, for example, be superimposed over a map (e.g., a resort map or topographical map) or other representation of an area in which the winter sports athlete is or was traveling. In particular embodiments, the system is configured to generate a graphical representation of a position of a skier's skis or a snowboarder's snowboard along the path (e.g., a position or angle of the snowboard or skis during a particular turn, etc.)

Returning to Step 430, the system measures one or more additional pieces of movement and other data associated with the winter sports athlete. The system may, for example, comprise one or more additional sensors such as, for example, one or more Global Positioning Sensors (GPS), one or more altimeters, one or more health monitors, one or more pressure sensors, etc. In various embodiments, the system is configured to use these one or more sensors to measure the additional movement data such as, for example, location, heading, speed, force (e.g., applied using ski poles), altitude, heart rate, etc. The system may, in various embodiments, use data measured using these one or more additional sensors in combination with measured magnetic field information for one or more magnets to determine the information such as speed, heading, acceleration, body position, path traveled, and any other suitable information.

Use of One or More Additional Sensors to Determine Additional Information for a User In various embodiments, the system is configured to utilize information received from or determined by one or more sensors in addition to the magnetometer discussed above. These additional sensors are discussed below.

Global Positioning System

In various embodiments, the system is configured to use a suitable global positioning system to determine a substantially current location of the winter sports athlete. In such embodiments, the system may be configured to use any suitable dead reckoning technique to determine a change in location or substantially current (e.g., current) location of a winter sports athlete based on a starting location (e.g., a starting location determined using GPS) and heading and velocity information determined using a magnetometer as discussed above. The system may for example, determine a current location of the winter sports athlete by determining the current location based on directions in which the winter sports athlete traveled from the starting location and how long and at what speed the winter sports athlete traveled in any particular direction from the starting location.

One or More Athlete Health Monitors

In various embodiments, the system is configured to use one or more athlete health monitors to monitor a winter sports athlete's health, and provide feedback (e.g., instantaneous feedback or post-activity feedback) to the winter sports athlete. In various embodiments, the one or more athlete health monitors may include, for example, one or more heart rate monitors, one or more perspiration rate monitors, one or more pulse oximeters, one or more respiration rate monitors, one or more energy output monitors (e.g., for monitoring calorie burn over time), or any other suitable health monitor. The system may, for example, use one or more heart rate monitors to determine a variability of a winter sports athlete's heart rate, for example, by measuring a time between heart beats of the athlete, a change in time between heartbeats, etc.

As a particular example, the system may be configured to utilize one or more heart rate monitors to monitor a winter sports athlete's heart rate during a particular ski or snowboard run. In particular embodiments, the system is configured to track a winter sports athlete's heart rate during a particular run and provide heart rate data to the winter sports athlete to enable the winter sports athlete to review the winter sports athlete's heart rate during particular portions of the run. The system may, for example: (1) enable the winter sports athlete to provide a target heart rate; (2) receive a desired target heart rate from the winter sports athlete; (3) monitor the winter sports athlete's heart rate during a particular activity; (4) determine whether the winter sports athlete's heart rate is at least about the desired target heart rate during the particular activity; and (5) in response to determining that the winter sports athlete's heart rate is not at least about the desired target heart rate, notify the winter sports athlete that the winter sports athlete should increase the winter sports athlete's exertion level in order to elevate the winter sports athlete's heart rate. In still other embodiments, the system may be configured to monitor the winter sports athlete's heart rate and provide a warning to the winter sports athlete in response to determining that the winter sports athlete's heart rate has exceeded a threshold level or has exceeded a particular level for a particular length of time. In various embodiments, the threshold level may be determined based in part on a winter sports athlete's age, gender, overall health, one or more health conditions that the winter sports athlete is experiencing, or any other suitable factor.

Returning to Step 440, the system stores heading, acceleration, velocity, and other movement data for the winter sports athlete in at least one data store. In particular embodiments the at least one data store is a local data store associated with a mobile computing device from which the one or more motion sensors took measurements related to the first magnet's magnetic field. In other embodiments, the at least one data store comprises one or more remote servers (e.g., cloud-based storage servers). In still other embodiments, the data store may include any suitable data store. In particular embodiments, the system is configured to enable a user to retrieve the stored data using a suitable computing device.

Continuing to Step 450, the system displays the heading, acceleration, velocity, visual representation of the path of the athlete over a particular period of time, and/or any other information related to the movement of the winter sports athlete determined by the system to a user (e.g., winter sports athlete). In various embodiments, the system is configured to display the heading, acceleration, and speed on a display associated with a mobile computing device comprising the first magnetometer that measured the first magnetic field information. In other embodiments, the system is configured to display the information on any other suitable display. In particular embodiment, the user may include any suitable user such as, for example, the winter sports athlete for whom the system is determining the movement information, a person associated with the winter sports athlete (e.g., such as a coach), or any other suitable person.

Illustrative Example and User Experience

Winter Sports Illustrative Example

In a particular illustrative example, a winter sports athlete (e.g., a skier or snowboarder) may utilize a tracking system to track one or more pieces of performance data (e.g., movement, speed, acceleration, airtime, etc.) while the winter sports athlete is participating in their winter sport. For the purposes of this illustrative example, the system will be described in the context of a skier. It should be understood that the tracking system could also be used in the tracking of performance data in other winter and non-winter sports or non-sport activities, such as, for example, snowboarding, water skiing, snowmobiling, wakeboarding, kite boarding, ice skating, etc.

In this example, a skier may wear a first computing device embodied as a pair of ski goggles and a second computing device embodied as a watch having a display screen. The watch and/or the ski goggles may comprise: (1) one or more magnetometers, such as any suitable magnetometer described above; (2) one or more sensors, such as any suitable sensor described in this document or any other suitable sensor; and/or (3) etc. The skier may further wear a pair of skis, each of which comprises one or more magnets disposed on any suitable portion of the ski (e.g., near the tip of the ski, near the tail of the ski, adjacent the binding of the ski, etc.). In other embodiments, the system may comprise one or more magnets disposed on the skier's boots, or in any other suitable location (e.g., the skier's gloves, helmet, etc.). The skier may further carry a ski pole in each hand, which may, for example, also comprise one or more magnets on any suitable portion of the ski pole.

In the embodiment described in this example, the system may be configured to determine (e.g., measure) magnetic field information for each of the one or more magnets, for example, using the one or more magnetometers. The system may then determine, based at least in part on the magnetic field information, any suitable information relating to the movement of the skier such as, for example: (1) a substantially current speed of the skier; (2) a maximum speed of the skier; (3) an acceleration of the skier; (4) an air time of the skier; (5) revolutions of the skier; (6) one or more tricks performed by the skier (e.g., one or more backflips, one or more front flips, one or more spins such as a 360 degree spin, etc.); (7) a number of falls by the skier; (8) a distance covered by the skier; (9) a number of vertical feet skied by the skier; (10) a heart rate of the skier; (11) a change in heart rate of the skier (e.g., at different speeds); (12) a smoothness and symmetry of turns performed by the skier; (13) a loss of speed of the skier as a result of particular turns or maneuvers (e.g., from turning too sharply); and (14) any other suitable piece of data related to skiing.

In particular embodiments, the system is further configured to determine a position of the skier's poles, skis and/or helmet during a particular skiing activity (e.g., whether the skier is in a tucked position, whether the skier is using the poles to propel themselves forward at a particular moment, etc.). The system may then determine an associated acceleration, increase in speed, loss of speed, speed of rotation, or any other suitable factor based on various pole positions. The system may, for example, determine a particular body position during a tuck in which the skier accelerates the most rapidly while traveling downhill, etc.

The skier may then complete any suitable skiing activity (e.g., skiing down a ski slope, performing one or more ski tricks at a ski park or on a half-pipe, etc.). While the skier is skiing, the system records data using the one or more magnetometers and determines any other data such as the data described above. The system may further record data using one or more other sensors, cameras, etc. such as, for example: (1) one or more videos using a camera disposed on the ski goggles; (2) a heart rate of the skier using a heart rate monitor operatively coupled to the watch; and/or (3) any other suitable data.

The skier may then, for example, view any of the determined data on the watch's display screen, or on any other suitable device. In particular embodiments, the system is configured to use the determined movement data to generate a visual representation of a path traveled by the skier over a particular period of time. The system may, for example, generate a two-dimensional or three-dimensional image that includes a line or other indication of a path traveled by the skier. The system may further indicate a position of one or more of the skier's skis at one or more particular points along the path. The generated visual representation may, for example, be superimposed over a map or other representation of an area in which the skier is skiing (e.g., a resort ski map, a topographical or other map of particular terrain, etc.). In various embodiments, the visual representation of the path may include one or more indicators related to the performance of the skier that may indicate, for example, the skier's speed along a particular portion of the path, a skier's altitude along a particular portion of the path, a location in which the skier went airborne along the path, a location in which the skier performed a trick along the path, etc. The system may represent different speeds, altitudes, etc. using different colors along different portions of the path, different types of lines to represent different portions of the path (e.g., dotted, dashed, thicker vs. thinner lines, etc.), or any other suitable manner of representing different performance data in addition to path data for the skier (e.g., or another person). The system may further display one or more indicia to indicate a location on the path in which the skier performed a particular activity (e.g., jump, trick, etc.) or used a particular skiing technique (e.g., entered a tuck).

In various embodiments, the system may store data related to the skier's movement or other suitable data to determine, for example: (1) a skier's best time on a particular ski run; (2) a skier's time relative to other skiers who may be using the system or a similar system; (3) a total number of mid-air rotations performed by a skier during a particular period of time (e.g., a number of spins performed on a half-pipe, etc.); and/or (4) any other suitable data. The skier may then view or review this data at any time using any suitable computing device.

In various embodiments, the system is configured to enable a skier or another individual to review performance data from a particular ski activity. The system may, for example, enable a skier to review portions of a particular run where the skier lost speed (e.g., due to changing direction too rapidly). In various embodiments, the system may be configured to substantially automatically determine techniques for improving a skier's performance over a particular ski run or slope. The system may, for example, determine, based on speed, acceleration, and heading data, a substantially optimal portion of a particular turn or type of turn at which the skier should accelerate (e.g., enter a tuck position), an angle at which a skier should approach the particular turn (e.g., a turn of a particular degree), or make any other suitable determination in order to substantially maximize a speed of the skier as the skier exits the particular turn. In various embodiments, the system is configured to determine optimal approaches to various skiing activities based at least in part on the skier's own past performance data.

In various embodiments, the system is configured to provide substantially instantaneous feedback during a ski run, for example, by speaking skiing advice through a speaker on the computerized ski goggles. For example, the system may be configured to determine based on a geolocation of the skier and past performance data for a particular ski run that the skier is currently skiing down, that the skier could increase their speed by entering a tuck earlier during a downhill portion. The system may notify the skier of this determination, for example, by telling the skier via the speaker to "tuck now" as the skier enters the downhill portion, by displaying an indication on the watch or on a display associated with the computerized ski goggles, or in any other suitable manner.

While skiing, the skier may, for example, prompt the computerized goggles to announce a current speed of the skier, a total distance traveled, or any other piece of information. The skier may, for example, request particular pieces of data using one or more voice commands (e.g., "How fast am I going?" etc.). The pair of computerized eyewear may report the requested data, for example, via one or more speakers embedded in the pair of eyewear, via a display or heads up display built into the computerized eyewear (e.g., in one or more of the eyewear's lenses), etc.

In various embodiments, the pair of eyewear may be configured to receive requests and display information via a suitable display screen, which may, in some embodiments, be embedded in the pair of eyewear. In other embodiments, the pair of eyewear may be configured to receive requests and display information on a mobile computing device (e.g., such as a smartphone or watch) with which the pair of eyewear is configured to communicate using any suitable wireless protocol (e.g., Bluetooth, near-field communication, etc.).

Alternative Embodiments

Particular embodiments of a winter sports tracking system may include features in addition to those discussed above. Various alternative embodiments are discussed more fully below.

Magnetic Field Information Determination for a Plurality of Magnets

In various embodiments, the system is further configured to determine magnetic field information for a second magnet mounted on the winter sports athlete or their equipment, for example, using the first magnetometer or using a second magnetometer. In such embodiments, the first magnet may, for example, be disposed on a first ski, and the second magnet may be disposed, for example, on a second ski. In such embodiments, the system may be configured to determine velocity, acceleration, heading, position, orientation, and other information for both the first and second skis as a skier is skiing down a mountain. In various embodiments, the system may determine more accurate heading information for a winter sports athlete or other vehicle or individual using a plurality of magnets, for example, because the first and second skis may not be parallel during different portions of a particular ski run.

In such embodiments, the system may be configured to determine speed, distance, and other information about the winter sports athlete based in part on measurements made for, and determined from, magnetic field information for both the first and second magnet. As may be understood by one skilled in the art, both skis of a winter sports athlete may not be positioned at the same angle or in the same direction during a turn. For example, the skier may become off-balanced, one or more skis may leave the support surface during a run (e.g., after traveling over a bump) causing the skier's individual ski to point in a direction or be positioned at an angle different than a direction in which the skier is traveling (e.g., or at an angle other than an angle which would be expected to cause the skier to turn in a manner in which they are currently turning).

In various embodiments, the system is configured to generate a graphical representation of each individual ski during a ski run (e.g., along with speed and other data). In particular embodiments, a skier may use such information to recognize particular issues related to performance (e.g., the skier may recognize that they are not as strong when turning left versus turning right, etc.).

Skier Performance Recommendation

In various embodiments, the system is configured to enable a skier or another individual to review performance data during a particular run. The system may, for example, enable a skier to review portions of a particular run where the skier lost speed (e.g., due to changing direction too rapidly, failing to pole quickly enough, etc.). In various embodiments, the system may be configured to substantially automatically determine techniques for improving a skier's performance over a particular course. The system may, for example, determine, based on speed, acceleration, and heading data, a substantially optimal portion of a particular turn or type of turn at which the skier should accelerate (e.g., begin to pole or pole harder), an angle at which a skier should approach the particular turn (e.g., a turn of a particular degree), or make any other suitable determination in order to substantially maximize a speed of the skier as the skier exits the particular turn. In various embodiments, the system is configured to determine optimal approaches to various skiing events based at least in part on the skier's own past performance data.

Non-Vehicular Motion Tracking Using One or More Magnetometers

In various embodiments, the system is configured to utilize one or more magnetometers and one or more magnets to track movement of one or more objects and/or individuals other than a vehicle. In particular embodiments, the system is configured to use the one or more magnetometers and the one or more magnets to track movement where the movement is substantially repetitive, or has a substantially consistent pattern. In some embodiments, the system may, for example, be configured to track movement such as, for example, rowing (e.g., using one or more magnets on an oar or paddle to track the number of strokes executed or other suitable data), weight lifting (e.g., using one or more magnets on or adjacent a particular portion of a weight lifter's body, or on a particular piece of weight lifting equipment to count a number of reps or other suitable data), swimming (e.g., using one or more magnets on a swimmer's arm, leg, etc. to count a swimmer's strokes or other data), or any other suitable activity.

Individual Tracking and Performance Data Determination Using One or More Magnetometers In various embodiments, a tracking system may be configured to track and determine performance and other motion data for one or more athletes or other individuals such as, for example, a skier, a snowboarder, an ice skater, a water skier, a snowmobiler, a kite boarder, a surfer, a body-surfer, a skateboarder, a roller-blader, a roller-skater, or any individual or athlete who may or may not be using one or more particular pieces of equipment during the performance of a particular activity. In such embodiments, the tracking system may comprise one or more computing devices, one or more sensors (e.g., such as one or more sensors described above), one or more magnetometers, and one or more magnets, each of which may, for example be disposed on and/or embodied as: (1) a particular portion of the individual's body; (2) a particular piece of clothing (e.g., one or more gloves, a hat, a headband, a scarf, a jacket, a pair of pants, a shirt, an undergarment, a bathing suit, a wetsuit, a rash guard, or any other suitable piece of clothing); (3) one or more pieces of equipment (e.g., one or more skis, one or more ski boots, one or more ski bindings, one or more ski poles, a snowboard, one or more snowboard boots, one or more snowboard bindings, one or more water skis, a wakeboard, one or more ice skates, one or more snowmobiles, or any other suitable piece of equipment); (4) one or more pieces of eyewear (e.g., a pair of glasses, sunglasses, goggles, ski goggles, etc.); and/or (5) etc.

In various embodiments, the system comprises a plurality of sensors, magnetometers, accelerometers, and/or computing devices, which may, for example, enable the system to track and determine different types of information associated with an individual's movement and performance. In particular embodiments, the system may include: (1) one or more sensors on different pieces of equipment (e.g., on each of a skier's two skis); (2) one or more computing devices (e.g., a mobile computing device embodied as ski goggles, a second mobile computing device embodied as a watch, etc.); (3) one or more magnetometers (e.g., which may, for example, be part of the other computing devices or sensors, or include stand-alone magnetometers); and/or (4) one or more magnets (e.g., disposed on any suitable portion of the individual or a piece of equipment used by the individual). In various embodiments, the tracking system may include one or more applications, which may, for example, be configured to run on a computing device (e.g., a smartphone, watch, pair of eyewear) and enable a user (e.g., the athlete for which tracking and performance data is determined) to view any data collected and/or determined by the system. In various embodiments, the system may further include one or more altimeters to determine a substantially current altitude of the individual, a change in altitude of the individual, etc.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. In particular, it should be understood that although various embodiments of a winter sports tracking system are described above in the context of skiing and snowboarding, the invention can be embodied and utilized in tracking any other suitable type of activity, such as any other type of activity mentioned above (e.g., biking, hiking, rowing, swimming, etc.). Additionally, although the system is described in the context of a winter sports tracking system, it should be understood that various embodiments of the system may be utilized to track non-winter sports activities, objects including pieces of athletic equipment, individuals, vehicles, etc. Although specific terms are employed herein, they are used in a generic and descriptive sense only and not for the purposes of limitation.

What is claimed is:

1. A computer-implemented method of determining individual movement for a winter sports athlete, the method comprising:
 providing a mobile computing device comprising:
  one or more processors;
  a display; and
  one or more magnetometers;
 providing a first magnet for placement on a first piece of winter sports equipment used by the winter sports athlete and a second magnet for placement on a second piece of winter sports equipment used by the winter sports athlete;
 measuring, by the one or more processors, using the one or more magnetometers, (i) first magnetic field information for the first magnet disposed on a portion of the first piece of winter sports equipment used by the winter sports athlete and (ii) second magnetic field information for the second magnet disposed on a portion of the second piece of winter sports equipment used by the winter sports athlete;
 determining, by the one or more processors, using the first magnetic field information and the second magnetic field information, one or more pieces of individual movement data associated with the winter sports athlete;
 generating, by the one or more processors, a graphical representation of the one or more pieces of individual movement data; and
 displaying, by the one or more processors on the display, the generated graphical representation to the winter sports athlete.

2. The computer-implemented method of claim 1, wherein the mobile computing device comprises a mobile computing device selected from a group consisting of:
 a pair of computerized eyewear; and
 a computerized watch.

3. The computer-implemented method of claim 1, wherein:
 the winter sports athlete is a skier; and
 the first magnet is disposed in a location selected from a group consisting of:
  one of the skier's skis;
  one of the skier's gloves;
  one of the skier's boots;
  one of the skier's ski bindings; and
  one of the skier's poles.

4. The computer-implemented method of claim 1, wherein measuring, by the one or more processors, using the one or more magnetometers, magnetic field information for the first magnet disposed on a portion of the piece of winter sports equipment used by the winter sports athlete comprises:
 taking a first magnetic field measurement for the first magnet using the one or more magnetometers at a first time; and
 taking a second magnetic field measurement for the first magnet using the one or more magnetometers at a second time, wherein:
  the first magnetic field measurement comprises a first magnetic field strength and a first magnetic field direction of the first magnet at the first time; and
  the second magnetic field measurement comprises a second magnetic field strength and a second magnetic field direction of the first magnet at the second time.

5. The computer-implemented method of claim 4, wherein measuring, by the one or more processors, using the one or more magnetometers, magnetic field information for the first magnet disposed on a portion of the piece of winter sports equipment used by the winter sports athlete further comprises:
 taking a plurality of magnetic field measurements for the first magnet using the one or more magnetometers over a particular period of time.

6. The computer-implemented method of claim 5, wherein measuring, by the one or more processors, using the one or more magnetometers, magnetic field information for the first magnet disposed on a portion of the piece of winter sports equipment used by the winter sports athlete further comprises:
 continuously taking magnetic field measurements for the first magnet using the one or more magnetometers over the particular period of time.

7. The computer-implemented method of claim 6, wherein:
 determining, by the one or more processors, using the magnetic field information, the one or more pieces of individual movement data associated with the winter sports athlete comprises:
  using the plurality of magnetic field measurements to determine a change in position of the piece of winter sports equipment used by the winter sports athlete over the particular period of time; and
 generating, by the one or more processors, the graphical representation of the one or more pieces of individual movement data comprises:
  generating a graphical representation of the change in position of the piece of winter sports equipment over the particular period of time; and
  superimposing the graphical representation of the change in position of the piece of winter sports equipment over a topographical map of an area in which the winter sports athlete is performing their winter sport.

8. The computer-implemented method of claim 7, wherein the one or more pieces of individual movement data comprise four or more pieces of data selected from a group consisting of:
 a substantially current speed of the winter sports athlete;
 a maximum speed of the winter sports athlete during the particular period of time;
 an acceleration rate of the winter sports athlete during the particular period of time;
 an air time of the winter sports athlete during the particular period of time;
 revolutions of the winter sports athlete during the particular period of time;
 one or more tricks performed by the winter sports athlete during the particular period of time;
 a number of falls by the winter sports athlete during the particular period of time;

a distance covered by the winter sports athlete during the particular period of time;
a number of vertical feet traveled by the winter sports athlete during the particular period of time; and
a smoothness and symmetry of turns performed by the winter sports athlete during the particular period of time.

9. A computer system for determining and tracking performance data for a winter sports athlete comprising:
a memory;
one or more processors;
a display; and
one or more magnetometers, wherein the one or more processors are configured for:
measuring first magnetic field information for a first magnet disposed adjacent the winter sports athlete at a first time using the one or more magnetometers, the first magnetic field information comprising:
a first magnetic field strength; and
a first magnetic field direction;
measuring second magnetic field information for a second magnet disposed adjacent the winter sports athlete at the first time using the one or more magnetometers, the first magnetic field information comprising:
a second magnetic field strength; and
a second magnetic field direction;
storing the first magnetic field information and the second magnetic field information in memory;
measuring third magnetic field information for the first magnet at a second time using the one or more magnetometers, the second magnetic field information comprising:
a third magnetic field strength; and
a third magnetic field direction;
measuring fourth magnetic field information for the second magnet at the second time using the one or more magnetometers, the second magnetic field information comprising:
a fourth magnetic field strength; and
a fourth magnetic field direction;
storing the third magnetic field information and the fourth magnetic field information in memory;
calculating, using at least the first magnetic field information and the third magnetic field information, a change in relative position and orientation of the first magnet between the first time and the second time;
calculating, using at least the second magnetic field information and the fourth magnetic field information, a change in relative position and orientation of the second magnet between the first time and the second time;
determining, based at least in part on (i) the calculated relative position and orientation of the first magnet between the first time and the second time and (ii) the calculated relative position and orientation of the second magnet between the first time and the second time, a first position of the winter sports athlete at the first time and a second position of the winter sports athlete at the second time;
generating a graphical representation of the winter sports athlete at the first position and the second position; and
displaying the generated graphical representation on the display.

10. The computer system of claim 9, wherein the one or more processors are further configured for:
determining an instantaneous velocity of the winter sports athlete at the second time using at least the first magnetic field information, the second magnetic field information, the third magnetic field information, and the fourth magnetic field information;
receiving, at the second time, a request from the winter sports athlete to display the instantaneous velocity; and
at least partially in response to the request, displaying the instantaneous velocity on the display.

11. The computer system of claim 10, wherein the computer system is embodied as a mobile computing device selected from a group consisting of:
a pair of computerized eyewear; and
a computerized watch.

12. The computer system of claim 11, wherein:
the computer system comprises the first magnet and the second magnet; and
the first magnet and the second magnet comprises one or more electromagnets.

13. The computer system of claim 12, wherein:
the winter sports athlete is a snowboarder; and
the first magnet is disposed on the snowboarder's snowboard such that a magnetic field of the first magnet is parallel to a length of the snowboard.

14. The computer system of claim 12, wherein:
the winter sports athlete is a skier; and
the first magnet is disposed on the skier's first ski such that the magnetic field of the first magnet is parallel to a length of the first ski.

15. The computer system of claim 14, wherein:
the second magnet is disposed on the skier's second ski such that a magnetic field of the second magnet is parallel to a length of the second.

16. The computer system of claim 15, wherein the one or more processors are further configured for:
continuously measuring, over a particular period of time, a first instantaneous magnetic field strength and a first instantaneous magnetic field direction for the first magnet;
continuously measuring, over the particular period of time, a second instantaneous magnetic field strength and a second instantaneous magnetic field direction for the first magnet;
continuously determining, over the particular period of time, using at least the first instantaneous magnetic field strength, the second instantaneous magnetic field strength, the first instantaneous magnetic field direction, and the second instantaneous magnetic field direction:
a location of the skier;
a velocity of the skier;
an acceleration of the skier;
a position of the first ski;
a position of the second ski; and
a relative orientation of the first ski with respect to the second ski.

17. The computer system of claim 16, wherein the one or more processors are further configured for:
using the position of the first ski, the position of the second ski, and the relative orientation of the first ski with respect to the second ski to determine whether the skier performed a particular skiing maneuver during the particular period of time.

18. A computer system for determining and tracking performance data for a winter sports athlete comprising:
a memory;
one or more processors;

a display;
one or more global positioning sensors;
one or more altimeters; and
one or more magnetometers, wherein the one or more processors are configured for:
continuously measuring instantaneous first magnetic field information for a first magnet disposed on a first piece of equipment worn by the winter sports athlete over a period of time using the one or more magnetometers, the instantaneous first magnetic field information comprising:
instantaneous first magnetic field strength; and
instantaneous first magnetic field direction;
continuously measuring instantaneous second magnetic field information for a second magnet disposed on a second piece of equipment worn by the winter sports athlete over the period of time using the one or more magnetometers, the instantaneous magnetic field information comprising:
instantaneous second magnetic field strength; and
instantaneous second magnetic field direction;
storing (i) a plurality of the measured instantaneous first magnetic field information over the period of time in memory and (ii) a plurality of the measured instantaneous second magnetic field information over the period of time in memory;
continuously determining, based at least in part on (i) the plurality of the measured instantaneous first magnetic field information over the period of time in memory and (ii) the plurality of the measured instantaneous second magnetic field information over the period of time in memory, an instantaneous position of the winter sports athlete over the period of time using the one or more global positioning sensors;
storing a plurality of the determined instantaneous positions over the period of time in memory;
continuously measuring an instantaneous altitude of the winter sports athlete over the period of time using the one or more altimeters;
storing a plurality of the measured instantaneous altitudes over the period of time in memory;
continuously determining, for each of a plurality of points of time over the period of time, using at least the plurality of measured instantaneous magnetic field information, the plurality of instantaneous positions, and the plurality of instantaneous altitudes:
a location of the winter sports athlete;
a velocity of the winter sports athlete;
an acceleration of the winter sports athlete; and
a position of the piece of equipment worn by the winter sports athlete;
generating a graphical representation of the location of the winter sports athlete, the velocity of the winter sports athlete, the acceleration of the winter sports athlete, and the position of the piece of equipment worn by the winter sports athlete over the period of time; and
displaying the generated graphical representation on the display.

19. The computer system of claim 18, wherein:
the computer system is embodied as a pair of ski goggles;
the display is disposed adjacent the pair of ski goggles;
the first piece of equipment worn by the winter sports athlete comprises a first ski and the second piece of equipment worn by the winter sports athlete comprises a second ski.

* * * * *